(12) United States Patent
Swiegers et al.

(10) Patent No.: US 10,428,431 B2
(45) Date of Patent: Oct. 1, 2019

(54) MULTI-LAYER WATER-SPLITTING DEVICES

(71) Applicant: AQUAHYDREX PTY LTD, North Wollongong, NSW (AU)

(72) Inventors: Gerhard Frederick Swiegers, Wollongong (AU); David Leslie Officer, Wollongong (AU); Gordon George Wallace, Wollongong (AU)

(73) Assignee: AQUAHYDREX PTY LTD, North Wollongong (AU)

( * ) Notice: Subject to any disclaimer, the term of this patent is extended or adjusted under 35 U.S.C. 154(b) by 57 days.

(21) Appl. No.: 15/468,770

(22) Filed: Mar. 24, 2017

(65) Prior Publication Data

US 2017/0200561 A1    Jul. 13, 2017

Related U.S. Application Data

(63) Continuation of application No. 13/992,983, filed as application No. PCT/AU2011/001603 on Dec. 9, 2011, now Pat. No. 9,708,719.

(30) Foreign Application Priority Data

Dec. 10, 2010    (AU) ............................... 2010905437

(51) Int. Cl.
*C25B 9/06*    (2006.01)
*C25B 9/08*    (2006.01)
(Continued)

(52) U.S. Cl.
CPC ................ *C25B 9/06* (2013.01); *C25B 1/003* (2013.01); *C25B 1/10* (2013.01); *C25B 9/08* (2013.01);
(Continued)

(58) Field of Classification Search
CPC ....... C02F 1/46104–4678; C25B 1/003; C25B 1/04; C25B 1/06; C25B 1/10;
(Continued)

(56) References Cited

U.S. PATENT DOCUMENTS 4,020,389 A    4/1977    Dickson et al.
4,526,818 A    7/1985    Hoshikawa et al.
(Continued)

FOREIGN PATENT DOCUMENTS

CN    1870844 A    11/2006
DE    19846160 A1    4/2000
(Continued)

OTHER PUBLICATIONS

Japanese Office Action for Application No. 2016-251299, dated Dec. 19, 2017 (19 Pages).
(Continued)

*Primary Examiner* — Nicholas A Smith
(74) *Attorney, Agent, or Firm* — Leydig, Voit & Mayer, Ltd.

(57) ABSTRACT

Water-splitting devices and methods for manufacturing water-splitting devices or solar cells is disclosed. The method seeks to provide a relatively high-volume, low-cost mass-production method. In one example, the method facilitates simultaneous co-assembly of one or more sub-units and two or more polymer films or sheets to form a water-splitting device. According to another aspect, there is provided an improved water-splitting device. In one example form, there is provided a water-splitting device which includes a first electrode for producing oxygen gas and a second electrode for producing hydrogen gas from water. The first electrode and the second electrode are positioned between a first outer polymer layer and a second outer polymer layer, and at least
(Continued)

one spacer layer is positioned between the first outer polymer layer and the second outer polymer layer.

19 Claims, 15 Drawing Sheets

(51) Int. Cl.
  C25B 13/02      (2006.01)
  C25B 1/00       (2006.01)
  C25B 1/10       (2006.01)
  C25B 9/10       (2006.01)
  C25B 11/04      (2006.01)
  C25B 13/04      (2006.01)
  H01G 9/20       (2006.01)

(52) U.S. Cl.
  CPC ............ *C25B 9/10* (2013.01); *C25B 11/0415* (2013.01); *C25B 11/0447* (2013.01); *C25B 13/02* (2013.01); *C25B 13/04* (2013.01); *H01G 9/2004* (2013.01); *H01G 9/2031* (2013.01); *H01G 9/2059* (2013.01); *Y02E 10/542* (2013.01); *Y02E 60/368* (2013.01); *Y02E 70/10* (2013.01); *Y02P 70/521* (2015.11)

(58) Field of Classification Search
  CPC ........... C25B 9/06–10; C25B 13/00–02; F02B 43/10; F02B 2043/106; F02M 25/12
  See application file for complete search history.

(56) References Cited

U.S. PATENT DOCUMENTS

| | | | |
|---|---|---|---|
| 4,650,554 A | 3/1987 | Gordon | |
| 4,656,103 A | 4/1987 | Reichman et al. | |
| 4,684,353 A | 8/1987 | deSouza | |
| 5,395,501 A | 3/1995 | Rohrbacker et al. | |
| 5,423,967 A | 6/1995 | Kunimatsu et al. | |
| 5,650,058 A | 7/1997 | Wenske et al. | |
| 5,650,243 A | 7/1997 | Ferment | |
| 6,008,449 A | 12/1999 | Cole | |
| 6,045,942 A | 4/2000 | Miekka et al. | |
| 7,049,803 B2 | 5/2006 | Dorner et al. | |
| 7,245,414 B2 | 7/2007 | Liang et al. | |
| 7,459,065 B2 | 12/2008 | Kelly et al. | |
| 7,651,602 B2 | 1/2010 | Helmke et al. | |
| 8,123,915 B2 * | 2/2012 | Richards | C25B 1/04 204/252 |
| 8,349,165 B2 | 1/2013 | Tanaka et al. | |
| 8,388,818 B1 | 3/2013 | Menezes | |
| 2004/0040838 A1 | 3/2004 | Helmke et al. | |
| 2005/0106450 A1 | 5/2005 | Castro et al. | |
| 2005/0194041 A1 | 9/2005 | Fan et al. | |
| 2006/0146027 A1 | 7/2006 | Tracy et al. | |
| 2006/0272698 A1 | 12/2006 | Durvasula | |
| 2007/0196702 A1 * | 8/2007 | Sridhar | B60L 11/1875 429/411 |
| 2007/0289707 A1 | 12/2007 | Rohland et al. | |
| 2008/0223439 A1 | 9/2008 | Deng et al. | |
| 2008/0248350 A1 | 10/2008 | Little et al. | |
| 2009/0052129 A1 | 2/2009 | Tsai | |
| 2009/0061267 A1 | 3/2009 | Monzyk et al. | |
| 2009/0101521 A1 | 4/2009 | Bayer et al. | |
| 2009/0151150 A1 | 6/2009 | Ayala et al. | |
| 2009/0153465 A1 | 6/2009 | Shinn et al. | |
| 2009/0165933 A1 | 7/2009 | Losch et al. | |
| 2010/0032221 A1 | 2/2010 | Storey | |
| 2010/0039594 A1 | 2/2010 | Golan et al. | |
| 2010/0155258 A1 | 6/2010 | Kirk et al. | |
| 2010/0196800 A1 * | 8/2010 | Markoski | H01M 8/08 429/523 |
| 2010/0288647 A1 | 11/2010 | Highgate | |
| 2011/0042228 A1 | 2/2011 | Hinatsu et al. | |
| 2012/0149789 A1 * | 6/2012 | Greenbaum | C01B 13/0207 518/704 |
| 2012/0308807 A1 | 12/2012 | Edwards | |
| 2014/0048423 A1 | 2/2014 | Swiegers et al. | |

FOREIGN PATENT DOCUMENTS

| | | |
|---|---|---|
| EP | 0 499 005 A2 | 8/1992 |
| EP | 0 348 229 B1 | 4/1994 |
| EP | 1 449 292 A2 | 8/2004 |
| EP | 2 172 988 A2 | 4/2010 |
| EP | 1 658 652 B1 | 1/2011 |
| JP | 53-075173 A | 7/1978 |
| JP | 56-087684 A | 7/1981 |
| JP | 57-178220 A | 11/1982 |
| JP | 61-067026 A | 4/1986 |
| JP | 62-014119 A | 1/1987 |
| JP | 63-014480 A | 1/1988 |
| JP | 03-255605 A | 11/1991 |
| JP | 04-020936 A | 1/1992 |
| JP | 05-055617 A | 3/1993 |
| JP | 06-507450 A | 8/1994 |
| JP | 06-334207 A | 12/1994 |
| JP | 07-037559 A | 2/1995 |
| JP | 07-064038 A | 3/1995 |
| JP | 08-001165 A | 1/1996 |
| JP | 08-064852 A | 3/1996 |
| JP | 08-325772 A | 12/1996 |
| JP | 11-042481 A | 2/1999 |
| JP | 11-086807 A | 3/1999 |
| JP | 3034519 B1 | 4/2000 |
| JP | 2001-345459 A | 12/2001 |
| JP | 2004-225148 A | 8/2004 |
| JP | 2004225148 A * | 8/2004 |
| JP | 2004-250736 A | 9/2004 |
| JP | 2004-292284 A | 10/2004 |
| JP | 2005-142121 A | 6/2005 |
| JP | 2007-018909 A | 1/2007 |
| JP | 2007-526948 A | 9/2007 |
| JP | 2008-052168 A | 3/2008 |
| JP | 2009-086752 A | 4/2009 |
| JP | 2009-232678 A | 10/2009 |
| JP | 2009-238914 A | 10/2009 |
| JP | 2010-004030 A | 1/2010 |
| JP | 2012-036413 A | 2/2012 |
| JP | 05-198319 B2 | 5/2013 |
| JP | 05-266932 B2 | 8/2013 |
| KR | 20010029825 A | 4/2001 |
| KR | 20040078553 A | 9/2004 |
| RU | 93804 U1 | 5/2010 |
| WO | 00/034184 A1 | 6/2000 |
| WO | 01/066362 A1 | 9/2001 |
| WO | 02/025324 A1 | 3/2002 |
| WO | 2004/003645 A1 | 1/2004 |
| WO | 2007/002989 A1 | 1/2007 |
| WO | 2008/116254 A1 | 10/2008 |
| WO | 2009/015127 A1 | 1/2009 |
| WO | 2009/056348 A1 | 5/2009 |
| WO | 2010/061766 A1 | 6/2010 |
| WO | 2010/067721 A1 | 6/2010 |
| WO | 2011/089904 A1 | 7/2011 |
| WO | 2012/122600 A1 | 9/2012 |

OTHER PUBLICATIONS

Balwin et al., Preparation of porous electrodes and laminated electrode-membrane structures for polymer electrolyte fuel cells (PEFC). Solid State Ionics 77 (1995), p. 324-330.

Brimblecombe et al., Sustained water oxidation by a bioinspired manganese cluster. Angewandte Chemie International Edition (2008), vol. 47, p. 7335-7338.

Brimblecombe et al., Solar driven water oxidation by a bioinspired manganese molecular catalyst. J Am Chem Soc. Mar. 10, 2010;132(9)2892-4.

Brimblecombe et al., A tandem water-splitting devise based on a bio-inspired manganese catalyst. Chemistry and Sustainability 2010;3:1146-50.

(56) References Cited

OTHER PUBLICATIONS

Li et al., A photoelectrochemical device for visible light driven water splitting by a molecular ruthenium catalyst assembled on dye-sensitized nanostructured Ti02. Chem Commun (Camb). Oct. 21, 2010;46(39):7307-9.

Mozer et al., Flexible and Compressible Goretex-PEDOT Membrane Electrodes for Solid-State Dye-Sensitized Solar Cells. Published in Langmuir (2010), vol. 26(3), p. 1452-1455.

Winther-Jensen et al., Conducting Polymer Composite Materials for Hydrogen Generation. Advanced Materials 2010;22:1727-1730.

Winther-Jensen et al., Towards hydrogen production using a breathable electrode structure to directly separate gases in the water splitting reaction. International Journal of Hydrogen Energy. Mar. 20, 2012. 5 pages.

\* cited by examiner

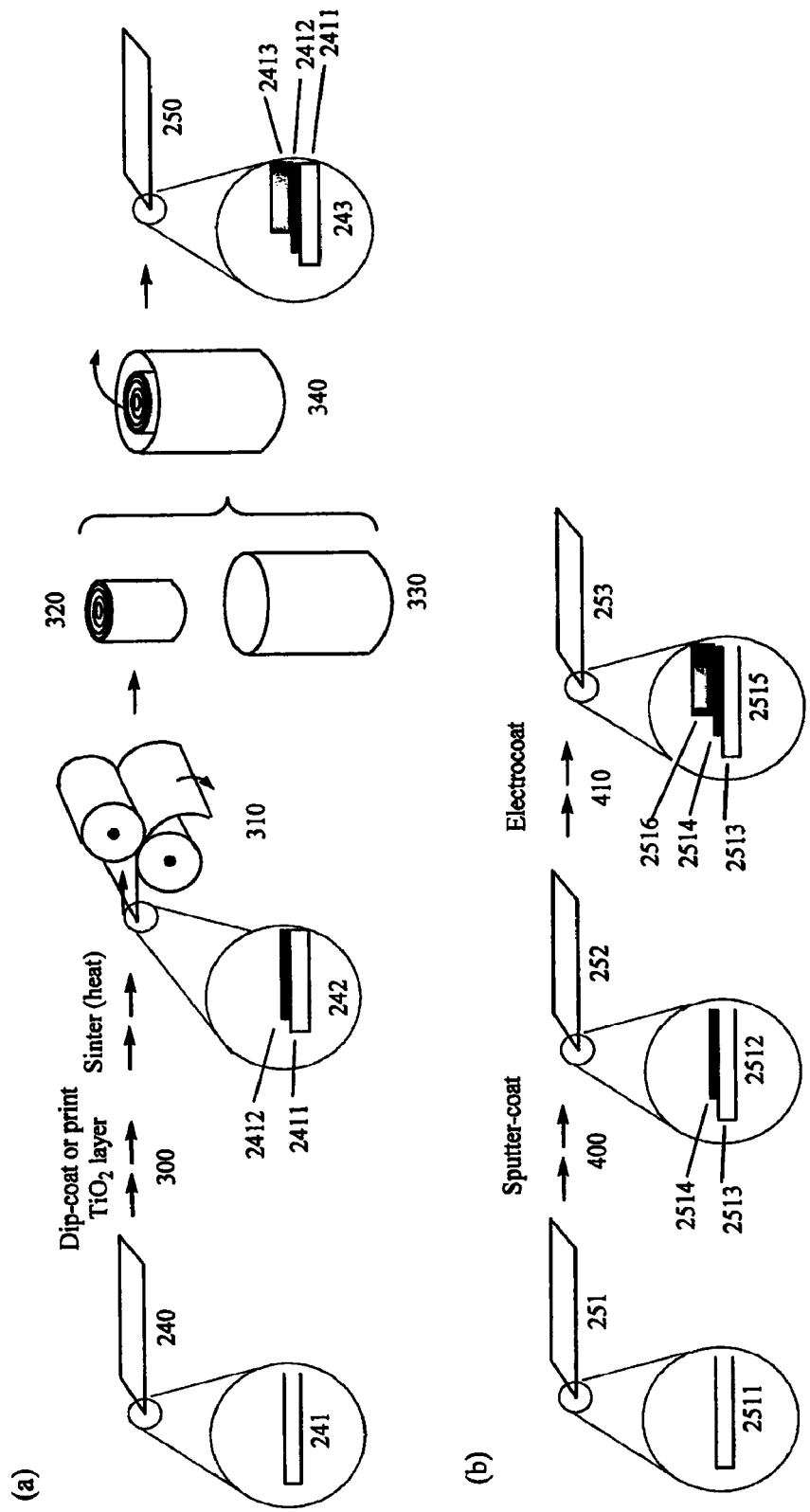
FIGURE 5 (a)-(b)

FIGURE 8
Example: External Electrical Contact - Lower Electrode
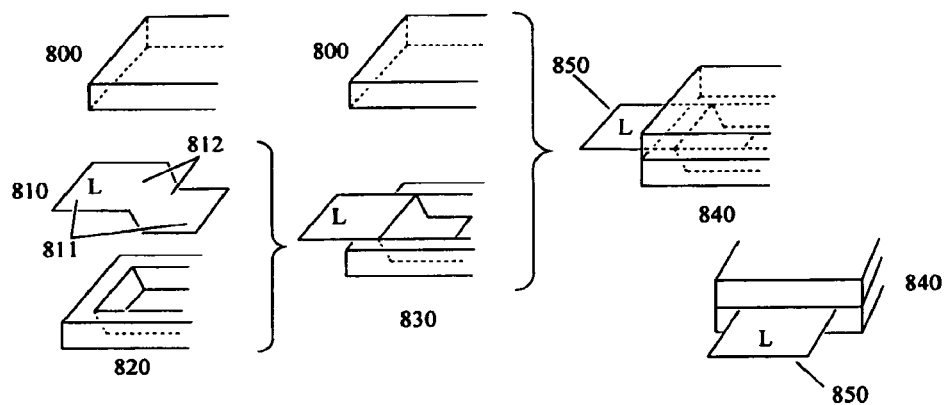
Example: External Electrical Contact - Upper Electrode
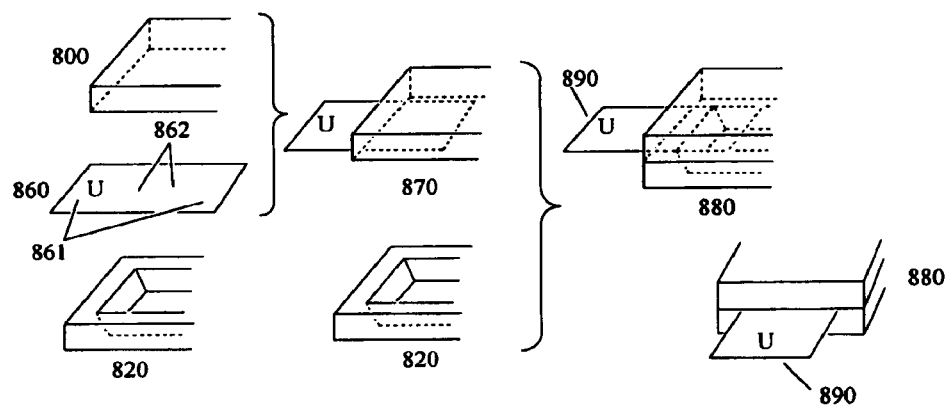
Connecting Cells in Series
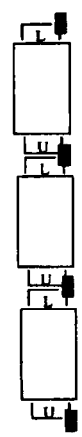
Connecting Cells in Parallel
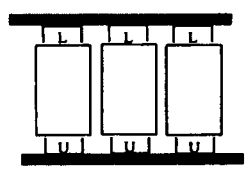

Example: Microfuidic Plumbing (Gas or Liquid)
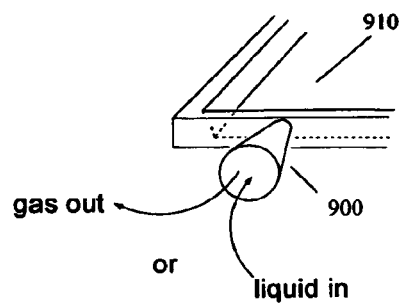
Example: Microfuidic Plumbing with In-Built Spacer (Gas only)
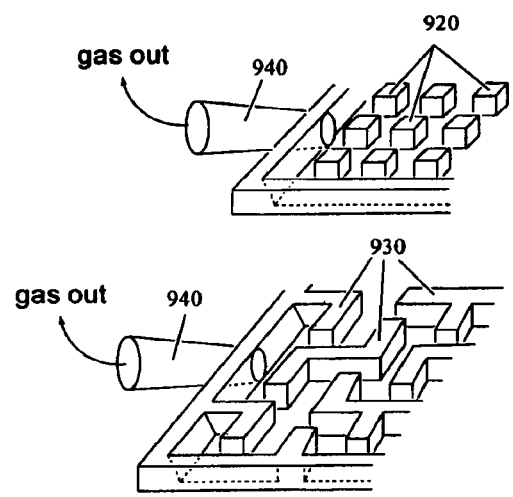
FIGURE 9

MULTI-LAYER WATER-SPLITTING DEVICES

CROSS REFERENCE TO RELATED APPLICATION

The present application is a Continuation of U.S. application Ser. No. 13/992,983 filed Jun. 10, 2013, which is a National Stage Entry of International Application No. PCT/AU2011/001603 filed on Dec. 9, 2011, and claims priority under 35 U.S.C. § 119 to Australian Patent Application No. 2010905437 filed on Dec. 10, 2010 in Australia. The disclosures of which are incorporated herein by reference in their entirety.

FIELD OF THE INVENTION

The present invention generally relates to water-splitting devices, such as solar cells, and in one particular aspect to improvements in the manufacture of water-splitting devices.

BACKGROUND OF THE INVENTION

Electrical devices that interact with light are well known. Examples include light-emitting diodes (which emit light), solar cell modules (which harvest light and turn it into electricity), and display screens (which may alter the light that they reflect). Most devices of this type use glass in one form or another as the key, transparent substrate material. This is often problematic however, since glass is typically fragile, heavy, expensive, and generally not well-suited to high-volume, low-cost mass-production. For this reason there is increasing interest in using cheaper, transparent polymeric materials in place of glass in devices of this type. Ideally, this will be combined with simple and inexpensive fabrication techniques for the devices themselves, such as the use of commercial printing processes.

One problem in this respect is to integrate a transparent polymer substrate into the fabrication of flexible electrical devices. Several approaches have been trialled and are being used. A common one (exemplified by the flexible touchscreen disclosed in EP 0348229) is to employ a transparent polymer sheet which has been coated on one side with a transparent electrically conducting layer. The sheet acts as a transparent electrode upon which the remainder of the device is built, usually as a multi-layer structure.

Another approach (exemplified by the photovoltaic device described in DE 19846160), is to fabricate the device on a non-transparent, flexible polymer film and then overlay a transparent polymer film upon it, to thereby exclude vapour, oxygen, or dust from the device.

While techniques such as those described above are technically successful, they are typically not amenable to high volume, low-cost mass-production manufacturing, especially in respect of devices which interact with light. The cost of manufacturing such devices may, however, be a critical factor in their physical uptake by society. Indeed, in many cases it is purely the cost and complexity of manufacturing such devices that has halted their general use and application.

A range of electrical devices are currently manufactured in flexible, low-profile formats. This includes batteries, capacitors, and super-capacitors which employ flexible polymeric bases or packaging elements. For example, JP7037559, JP11086807, EP0499005, KR20010029825, JP3034519, and U.S. Pat. No. 5,650,243 describe batteries, capacitors, or super-capacitors which are manufactured by laminating such devices between two or more polymer films. Batteries, capacitors, and super-capacitors are generally far less demanding to manufacture than light-modulating devices since they do not require optical transparency in the flexible polymeric components and their layered arrangement is typically much more forgiving of minor variations in the layer thicknesses. Light-modulating devices are notoriously sensitive such variations, which often destroy their utility completely. The laminating polymers in the abovementioned batteries, capacitors, and super-capacitors are therefore primarily incorporated for the purposes of excluding vapour, oxygen, or dust, or for making such devices more rugged.

In a related area, hydrogen ($H_2$) has long been considered an ideal fuel for the future. When burned in the presence of oxygen ($O_2$), hydrogen produces water ($H_2O$) as the only waste product. It therefore offers a clean, non-polluting alternative to fossil fuels.

Hydrogen has the added advantage that its reaction with oxygen may be made to take place in a solid-state device known as a fuel cell, which harnesses the resulting energy not as heat or pressure, but as an electrical current. Fuel cells offer greater inherent energetic efficiency than simple combustion of the type employed in, for example, internal combustion engines. A convenient source of hydrogen is the solar-powered splitting of water into hydrogen ($H_2$) and oxygen ($O_2$).

Hydrogen made from water using sunlight prospectively offers an abundant, renewable, clean energy source. However, no practical and economic device, or method of manufacture thereof, exists to facilitate this reaction. The potential of solar-produced hydrogen has, consequently, never been realized.

There is a need for improved water-splitting devices and/or methods for the improved manufacture thereof which address or at least ameliorate one or more problems inherent in the prior art.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

SUMMARY OF THE INVENTION

According to one aspect of the present invention there is provided a method for manufacturing (i.e. fabricating) water-splitting devices or solar cells. In a particular form, the method provides a relatively high-volume, low-cost mass-production method.

In one example embodiment, the method facilitates simultaneous co-assembly of one or more sub-units and two or more polymer films or sheets to form a water-splitting device.

According to another aspect, there is provided an improved water-splitting device, such as a water-splitting solar cell.

In one example form, there is provided a water-splitting device, including a first electrode for producing oxygen gas and a second electrode for producing hydrogen gas from water. The first electrode and the second electrode are positioned between a first outer polymer layer and a second outer polymer layer. At least one spacer layer is positioned between the first outer polymer layer and the second outer polymer layer.

In various further examples: two or more spacer layers are positioned between the first outer polymer layer and the second outer polymer layer; the at least one spacer layer, or at least one further spacer layer, is positioned between the first electrode and the second electrode; and/or the first outer polymer layer forms at least part of a channel for the oxygen gas and the second outer polymer layer forms at least part of a further channel for the hydrogen gas.

In still further examples: the first outer polymer layer and the second outer polymer layer are walls of extruded twin-wall sheets provided with ribs; at least one twin-wall sheet provided with ribs has a metal coating layer on at least part of an internal surface; the metal is nickel; a first wall of at least one twin-wall sheet is a conductive polymer and a second wall of the at least one twin-wall sheet is a non-conductive transparent polymer; and/or the first electrode is provided within a first twin-wall sheet, and the second electrode is provided within a second twin-wall sheet.

In one example form, there is provided a water-splitting device, including a water-splitting solar cell positioned between a first gas permeable layer and a second gas permeable layer, and a first polymer film and a second polymer film when joined together encapsulating the first gas permeable layer and the second gas permeable layer.

In another example form, there is provided a water-splitting device, including: a water-splitting device, including: a first outer polymer film; a second outer polymer film; a solar cell positioned between the first outer polymer film and the second outer polymer film; and, at least one spacer positioned between the first outer polymer film and the second outer polymer film.

Optionally, a first gas permeable layer is positioned between the first outer polymer film and the solar cell, and, a second gas permeable layer is positioned between the second outer polymer film and the solar cell.

In another example form, there is provided a method for manufacturing a water-splitting device, the method including, as a single lamination process: positioning a water-splitting solar cell at least partially within a recess provided in a first polymer film; fixing a second polymer film to the first polymer film so as to cover the water-splitting solar cell.

According to yet another aspect, water-splitting devices are manufactured using a set of readily assembled, robust sub-units which are then combined in a layered arrangement during the course of a polymer lamination process. Preferably, although not necessarily, at least one recess is provided within one or more of the laminating polymers that is specifically designed to accommodate the assembled sub-units. In a particular example form, the laminating polymers serve not only as a robust packaging device, but are integral to the assembly process itself. In another particular example form, at least one of the laminating polymers is involved in or otherwise facilitates operation of the device.

In one example form, there is provided a method for manufacturing a water-splitting device, the method including: positioning a water-splitting unit at least partially within a recess provided in a first polymer film; and, fixing an optically transparent polymer film to the first polymer film so as to cover the water-splitting unit.

In another example form, there is provided a water-splitting device, including: a water-splitting unit positioned at least partially within a recess provided in a first polymer film; and, an optically transparent polymer film fixed to the first polymer film so as to cover the water-splitting unit.

In a particular example, the device is formed during a single lamination process.

In another example embodiment there is provided a method for manufacturing (i.e. fabricating) a water-splitting device, the method including the step of simultaneously assembling a water-splitting unit (which may be comprised of a plurality of sub-units that have been previously laminated) with a first polymer film at a top of the water-splitting unit and a second polymer film at a bottom of the water-splitting unit.

In another example embodiment, there is provided a method for producing a water-splitting device, the method including: depositing a layer of metal on at least part of the internal surface(s) of a twin-wall sheet; combining the twin-wall sheet with at least one further twin-wall sheet to provide electrodes in the water-splitting device.

In another example embodiment there is provided a high-volume, low-cost mass-production method for manufacturing (i.e. fabricating) water-splitting devices, the method comprising a simultaneous co-assembly of:
(1) one or more distinct sub-units which, when assembled in a layered arrangement, cumulatively comprise a water-splitting unit; and
(2) two or more polymer films or sheets, wherein:
  (i) at least one of the polymer films or sheets is optically transparent, and
  (ii) at least one of the polymer films or sheets is embossed (i.e. impressed) with at least one recess into which the one or more sub-units at least partially fit;
wherein, one of the polymer films or sheets is laminated or positioned at the top of the unit and another of the polymer films or sheets is laminated or positioned at the bottom of the unit.

In another example embodiment there is provided a water-splitting device, including:
(1) one or more distinct sub-units assembled in a layered arrangement to form a water-splitting unit; and
(2) two or more polymer films or sheets, wherein:
  (i) at least one of the polymer films or sheets is optically transparent, and
  (ii) at least one of the polymer films or sheets is embossed (i.e. impressed) with at least one recess into which the one or more sub-units at least partially fit;
wherein, one of the polymer films or sheets is laminated or positioned at the top of the unit and another of the polymer films or sheets is laminated or positioned at the bottom of the unit.

It should be noted that reference to embossing (i.e. impressing) to provide at least one recess should also be taken as a reference to providing at least one indentation, depression, cavity or the like.

In a particular example, one or more of the sub-units may be electrodes via which electrical current can be obtained from or input to the water-splitting device.

Preferably but not exclusively, the polymer films are flexible or semi-rigid.

Preferably but not exclusively, the sub-units to be co-assembled, may be separately optimized, prepared, and fabricated so as to be suitable in a water-splitting device. Preferably but not exclusively, the co-assembled sub-units can be custom-designed to be readily accommodated within the housing that is provided by the recess(es) within the polymer laminate.

Preferably but not exclusively, the co-assembled sub-units may include one or more "spacers" (i.e. spacer elements or a "spacer layer") that maintain a suitable separation between other sub-units or components which have been or are to be layered. Examples of such spacers, e.g. forming a spacer layer, include, but are not limited to, ribs, embossed structures, beads, balls, etc. In still more specific, but non-limiting examples, the spacers may be Cellgard PP or PE separator membranes (Celgard LLC), glass bubbles of the type produced by 3M (3M™ Glass Bubbles iM30K), or the internal ribs or corrugations of extruded twin-wall sheet.

Preferably but not exclusively, the sub-units and polymer films or sheets can be assembled in a high-speed, continuous, web-fed process.

Preferably but not exclusively, the electrode layers within the co-assembled sub-units can have separate electrical connections that may involve conducting wires or tabs which pass between the polymer laminate to the outside.

According to various example aspects: the water-splitting unit is comprised of two or more sub-units and is at least partially formed as part of a single lamination process or a previous lamination process; the sub-units are layered films; at least one of the sub-units is an electrode; and/or at least one of the sub-units is a spacer layer or spacers.

According to an example application there is provided a water-splitting cell that yields hydrogen and oxygen from water when illuminated with sunlight and/or upon the application of a suitable voltage.

The water-splitting solar cell device preferably, but not exclusively, comprises of a co-laminate of multiple transparent polymer barrier films and gas-permeable (but not water-permeable) films sandwiching a water-splitting unit, in one example embodiment which has been co-assembled.

The water-splitting solar cell preferably, but not exclusively, includes a back-contact solar cell.

In an example form, the back-contact dye-sensitized solar cell preferably, but not exclusively, comprises of a co-laminate of two transparent polymer films sandwiching a multi-layer co-assembly. The latter preferably comprises of, but is not limited to, a co-assembly of the following items into a multi-layer structure in which the electrodes do not touch each other:
  (I) a porous, thin titanium foil electrode upon which a layer of $TiO_2$ has been deposited and sintered, whereafter a suitable light-harvesting dye (such as, but not limited to tris(2,2'-bipyridyl)ruthenium(II) perchlorate) has been adsorbed to the $TiO_2$ layer,
  (II) a spacer which may comprise of a Cellgard PP or PE separator membrane (Celgard LLC) or glass bubbles of the type produced by 3M (3M™ Glass Bubbles iM30K), and
  (III) a thin titanium foil counter electrode.

The entire assembly is preferably, but not exclusively, laminated on three sides and then back-filled with a suitable solvent containing the $I^-/I_3^-$ couple that is needed in dye-sensitized solar cells. The solvent may be, but is not limited to acetonitrile, glutaronitrile, methoxypropionitrile, or valeronitrile. The polymer sheets employed in the lamination may be, but are not limited to Du Pont Sirlyn, polycarbonate, and/or polyester.

However, in an example form for application in a water-splitting solar cell, the working electrode described in (I) above has been further elaborated by coating with a layer of the polymer Nafion containing the cubane water oxidation catalyst. An example process is described in International Patent Publication No. WO2008/116254-A1, entitled "Water Oxidation Catalyst" which is incorporated herein by cross-reference.

Alternatively, the working electrode described in (I) above may employ the methodology, catalysts, and dyes employed in the journal papers published in AngewandteChemie, International Edition (2008), Volume 47, page 7335 (entitled: "Sustained Water Oxidation Photocatalysis . . . "), or the Journal of the American Chemical Society (2010), volume 132, page 2892 (entitled: "Solar Driven Water Oxidation . . . "), which are incorporated herein by cross-reference. If necessary, an external voltage may be applied to the two electrodes in the assembly. The counter electrode in the assembly preferably, but not exclusively comprises of the electrode (III) above, or a similar conducting surface, coated with a conducting polymer composite, for example of the type described in the journal paper published in Advanced Materials (2010), Volume 22(15) page 1727 entitled "Conducting Polymer Composite Materials for Hydrogen Generation", which is incorporated herein by cross-reference.

BRIEF DESCRIPTION OF THE DRAWINGS

Embodiments of the present invention will now be described solely by way of non-limiting examples and with reference to the accompanying drawings in which:

FIG. 5(a) shows the preparation of the working electrode prior to the cell assembly. FIG. 5(b) shows the preparation of the counter electrode prior to the assembly. FIG. 5(c) shows how the various sub-units are assembled to create the final solid state dye-sensitized solar cell during the lamination process;

FIG. 8 is a schematic illustration of several examples of electrical contacts that may be used;

FIG. 9 is a schematic illustration of several examples of microfluidic plumbing that may be used to move liquids or gases within the cells;

DETAILED DESCRIPTION OF EXAMPLE EMBODIMENTS

Figure 1:
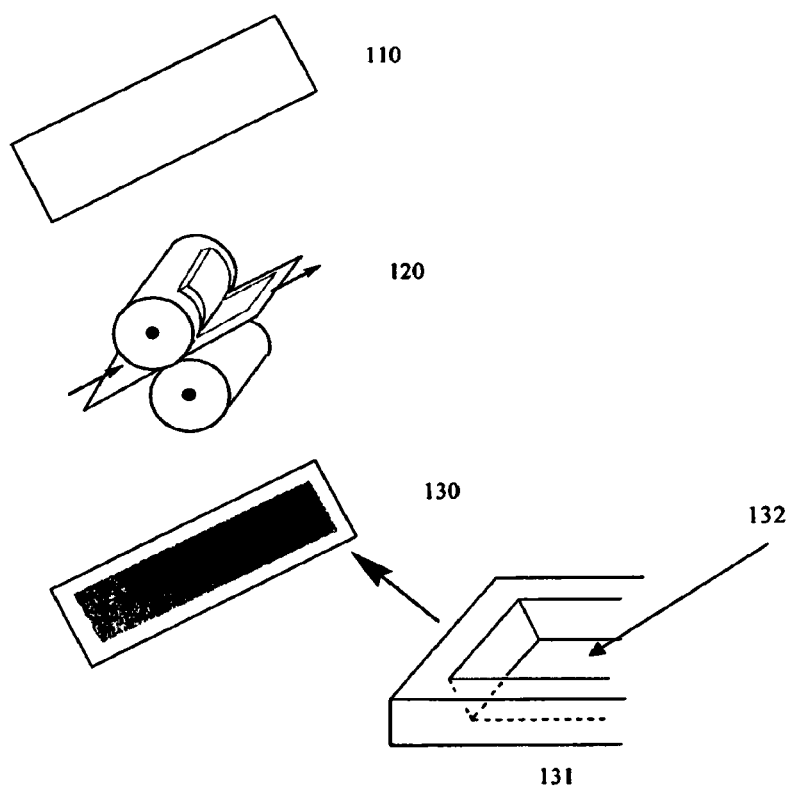
FIG. 1 is a schematic diagram illustrating how a recessed element may be embossed or impressed into polymer sheets or films.

The following modes, given by way of example only, are described in order to provide a more precise understanding of the subject matter of a preferred embodiment or embodiments. In the figures, incorporated to illustrate features of example embodiments, like reference numerals are used to identify like parts throughout the figures.

EXAMPLE 1

General Method for Implementation

FIG. 1 illustrates a general method by which suitable recesses may be embossed or impressed into polymer films. As shown in 120, a polymer film 110 is passed between embossing rollers which contain suitable surface relief structures or protrusions, to thereby impart, under high pressure and possibly, heat, at least one recess 132, indentation, depression, cavity or the like, on the embossed or impressed polymer film 130. If desired for particular applications, a plurality of recesses can be provided in polymer film 130. It should be noted that the particular geometric shape or profile of the recess can be varied, the particular profile of recess 132 as illustrated is by way of example only.

Features can be provided within or integrated as part of the recess, for example being formed during the embossing or impressing process. Such features might include pillars, wells, further recesses, walls, protrusions and/or projections, etc. The features could be used to assist in holding, retaining or positioning a unit or sub-unit in the recess.

Figure 2:
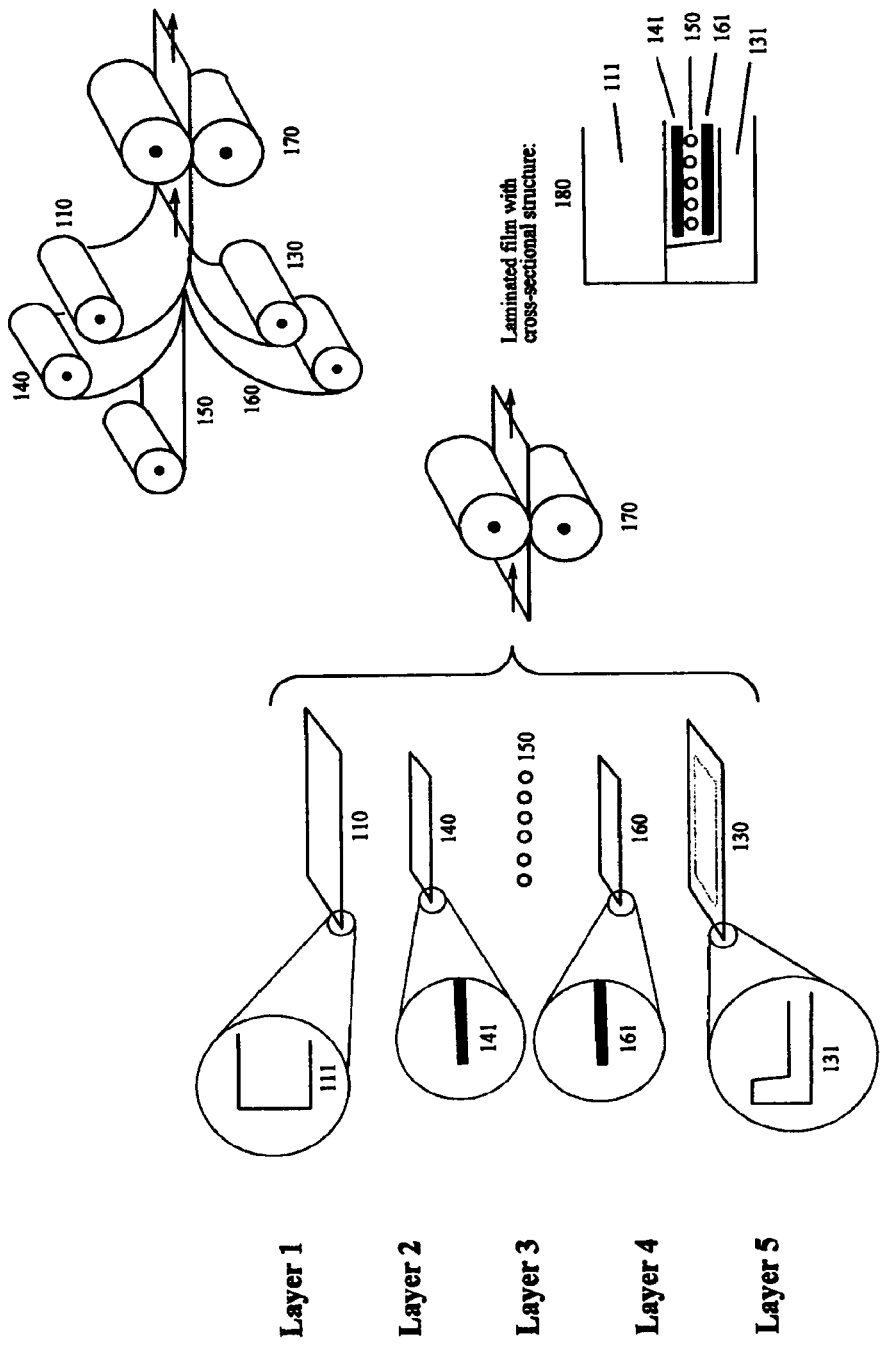
FIG. 2 is a schematic diagram displaying the common elements and general methodology of an example embodiment.

FIG. 2 schematically illustrates a general method of an example embodiment. The following items and sub-units are co-laminated by simultaneously passing between laminating rollers to form lamination 170:

(1) (Layer 1): a transparent polymer film 110 which (optionally) contains no recesses and therefore has the cross-sectional profile 111;
(2) (Layer 2): a thin electrode 140, having the cross-sectional profile 141, which may comprise of, but is not limited to:
  a. a metallic foil, such as a Ti, Pt, Al, or Au foil; or
  b. a printed conducting layer, such as a conductive, transparent or non-transparent ELG-class ink manufactured by NorCote Ltd (USA); or
  c. a deposited metallic conducting layer, such as a Al, Pt, or Au layer; or
  d. a deposited, transparent conducting layer such as an indium tin oxide (ITO) layer; or
  e. a printed or deposited conducting layer, such as a conducting polymer layer;
(3) (Layer 3): A spacer layer or spacers 150, which is used to separate the electrodes 140 and 160 and thereby prevent short-circuits. Examples of such spacers include, but are not limited to, ribs, embossed structures, beads, balls, etc. In still more specific, but non-limiting examples, the spacer layer may be a Cellgard PP or PE separator membrane (Celgard LLC) or glass bubbles of the type produced by 3M (3M™ Glass Bubbles iM30K);

(4) (Layer 4): A thin counter-electrode 160, having the cross-sectional profile 161, which may be comprised of, but is not limited to, any of the same materials described in (2)a-e above;
(5) (Layer 5): A polymer film 130, which has been embossed or impressed to have at least one recess; the polymer film 130 has the exemplary cross-sectional profile 131, in which the electrodes and spacers of (2)-(4) above can be accommodated.

Hence, there is provided a method for manufacturing a light-modulating electrical device, such as a water-splitting device. The method includes, as a single lamination process, positioning the light-modulating electrical unit (e.g. formed of sub-units being thin electrode 140, spacer layer 150, thin counter-electrode 160) at least partially within a recess provided in the polymer film 130 (i.e. a first polymer film). As part of the single lamination process, the transparent polymer film 110 (i.e. an optically transparent polymer film) is fixed to the polymer film 130 so as to cover the light-modulating electrical unit.

The upper right-hand detail of FIG. 2 shows a physical method of combining each of these layers into a single laminated device or product. Each layer would typically be continuously drawn off its own roll and combined, i.e. laminated into a single laminate 170. The method of lamination or fixing layers may involve any known method, including: (i) effectively, melting the upper and lower polymer sheets into each other (that is, by application of a hot-rolled lamination technique), or (ii) effectively gluing the upper and lower polymer sheets to each other (that is, by the application of, and intermediacy of a suitable adhesive; the adhesive may be activated by pressure, heat, light, or any other suitable method). In the case where an adhesive is used to effect lamination, it is to be understood that all of the techniques described in this and the other examples provided herein would typically be adapted to include the incorporation of an adhesive coating between relevant polymer films and sub-units involved in the lamination.

Following the lamination process, the final film has the exemplary cross-sectional profile 180. By way of illustration, the cross-sectional profile 180 of the final film includes the cross-sectional profiles of an upper transparent layer 111 below which lies, in the recessed cross-sectional profile 131, an upper electrode 141 separated by spacer layer 150 from a lower electrode 161. One of the electrodes would be the working electrode of the light modulating device and the other would be the counter electrode of the light modulating device.

Optionally, the recessed chamber containing electrode 140, spacer layer 150, and counter-electrode 160 may contain a liquid electrolyte that is introduced into a chamber formed by, or at least partially by, the recess, or is introduced into the recess itself, before, during, or in the process of lamination.

In various examples, the ordering of the transparent film and the embossed (i.e. impressed) film could be changed, for example the embossed film could be positioned as an upper layer and the transparent film could be positioned as a lower layer. Furthermore, either or both films could be embossed to each provide at least one recess. Thus, the light-modulating electrical unit, such as a water-splitting cell, could also at least partially fit into a further recess provided in the transparent polymer film so that both layers have recesses to accommodate the electrical unit. Still furthermore, both films could be transparent.

While sealed within the polymer laminate, the upper and lower electrodes 140 and 160 are generally arranged so as to be connected electrically to an external electrical circuit by the presence of electrical connections within the laminate that extend to the outside.

Optionally, the recessed chamber may have a tailored profile to incorporate in-built spacer elements to prevent one or more of the upper or lower electrodes from sticking to the laminating polymer films and thereby allowing the movement of liquid electrolyte to that electrode.

EXAMPLE 2

Fabrication of an Electrochromic Device

This example describes an improved method of fabrication of an electrochromic device, for example of the type described in International Publication No. WO2007002989 entitled "Charge Conducting Medium" which is incorporated herein by cross-reference.

Figure 3:
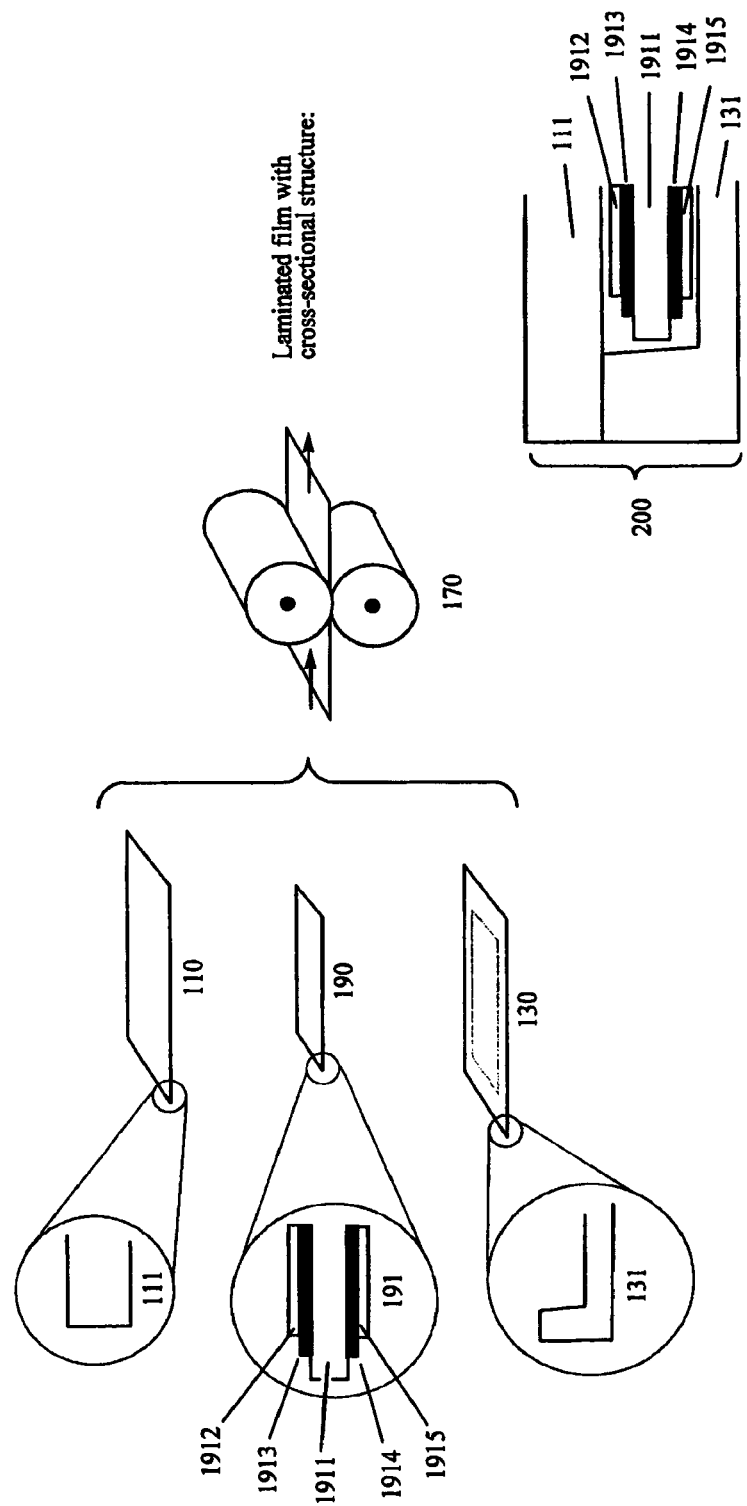
FIG. 3 is a schematic diagram of an electrochromic device.

FIG. 3 describes a method for manufacturing an electrochromic device. A PVDF membrane 1911 is coated on either side with a conducting layer, such as Ag, Pt, or ITO. The upper conducting layer 1913 is the working electrode and the lower conducting layer 1914 is the counter electrode. The upper conducting layer 1913 (working electrode) is then over-printed on the top side with a conducting polymer layer 1912, which may be PPy, PEDOT, or PANI. The lower conducting layer 1914 (counter-electrode) is overprinted with a different conducting polymer 1915, such as for example, PEDOT. The resulting sub-assembly is designated 190 in FIG. 3. Sub-assembly 190 is co-assembled with a transparent polymer film 110, of cross-sectional profile 111, and an embossed polymer film 130, having a cross-sectional profile 131, and subjected to lamination to produce laminate 170. The resulting film 200 has the exemplary cross-sectional structure shown. Film 200 includes a transparent upper polymer film 111 sandwiching with a lower, recessed polymer film of cross-sectional profile 131, where the recess contains the PVDF membrane 1911 which is sandwiched with an upper working electrode 1913 upon which is deposited a conducting polymer layer 1912, and a lower counter-electrode 1914 upon which is deposited a second conducting polymer 1915. The upper and lower electrodes are capable of being connected to an external circuit by the use and presence of a variety of types of connectors.

When a moderate voltage (for example 1-2 V) is applied across the electrodes, the conducting polymers change colour according to:
PPy: yellow to blue or vice versa
PEDOT: blue to sky blue, or vice versa
PANI: blue to green, or vice versa.

EXAMPLE 3

Fabrication of a Back-Contact Dye-Sensitized Solar Cell

Figure 4:
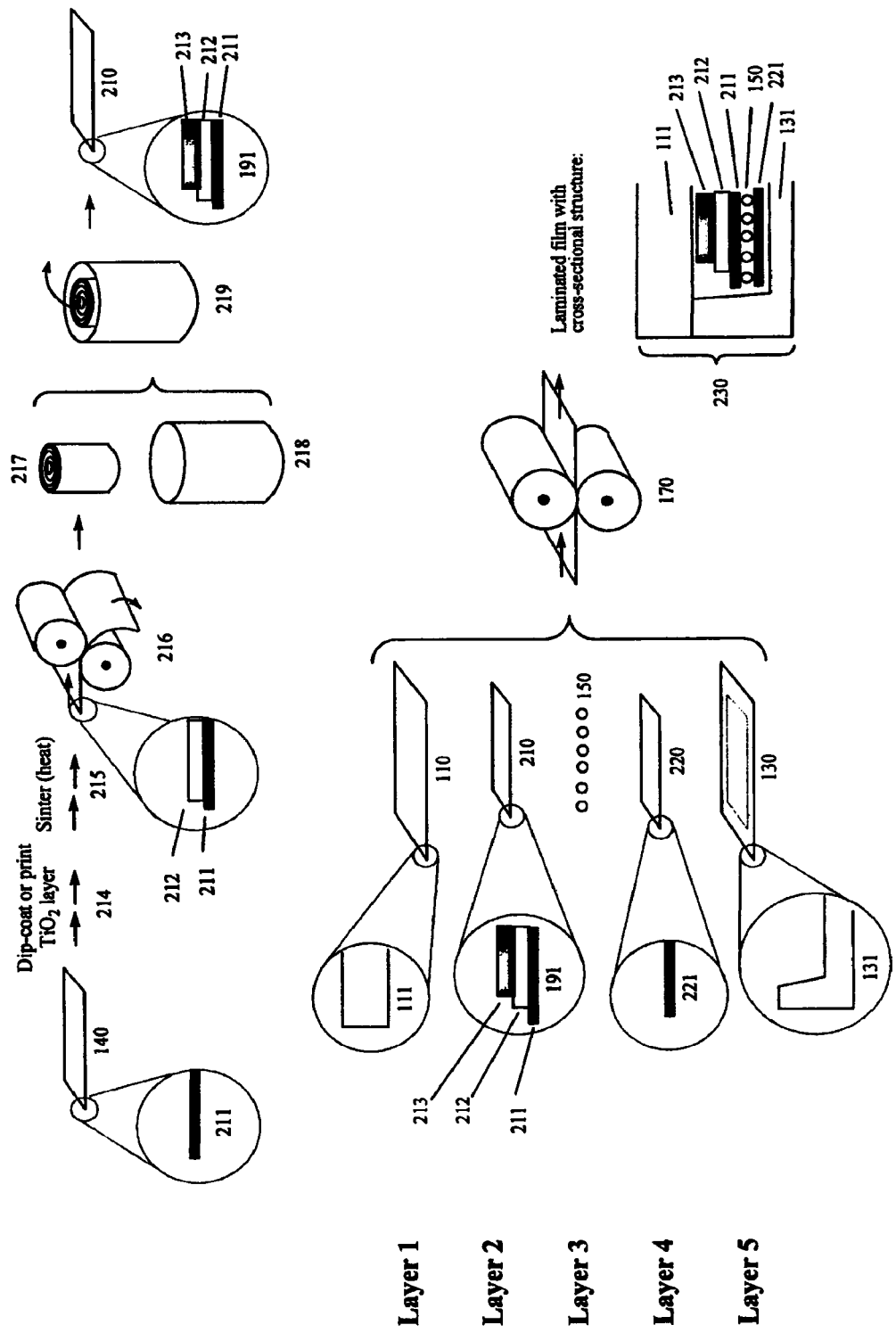
FIG. 4 is a schematic diagram of a back-contact dye-sensitized solar cell.

The top sequence in FIG. 4 depicts a method of pre-treating the working electrode in a back-contact dye-sensitized solar cell. The lower schematic in FIG. 4 depicts a process of assembling a back-contact dye-sensitized solar cell.

Referring to the top sequence in FIG. 4:

A thin, porous titanium foil 140, having cross-section 211 is dip-coated or printed with a $TiO_2$ layer as shown in step 214. The $TiO_2$ on the coated foil is then sintered by heating at step 215. After sintering, the foil has the cross sectional profile 211, coated with a $TiO_2$ layer 212. The foil is then rolled up at step 216, with spacers placed between the successive layers, to thereby yield the rolled up but separated foil 217. This separated foil 217 is placed in a bath 218 containing a solution of a suitable dye such as ruthenium(II) tris(2,2'-bipyridyl) perchlorate and allowed to soak at step 219. After soaking for a period of time, for example 24 hours, the $TiO_2$ layer has adsorbed significant quantities of the dye. The foil 217 is then removed from the bath 218, washed, dried, and unrolled to give the working electrode 210, which has the cross-sectional structure 191, involving the titanium foil 211 coated with the $TiO_2$ layer 212, upon which a layer of the dye 213 is adsorbed.

Referring to the lower schematic in FIG. 4:

A 5-layer co-assembly of the following is then formed in the sequence (top-to-bottom) given below and laminated as shown in FIG. 4:

(layer 1): An upper transparent polymer sheet 110 having the cross-sectional structure 111,
(layer 2): An upper working electrode 210, which has the cross-sectional profile 191 (containing the titanium foil 211, coated with sintered $TiO_2$ 212, upon which a layer of dye 213 has been adsorbed),
(layer 3): A spacer layer 150,
(layer 4): A lower counter-electrode 220, which comprises of a virgin titanium foil having cross-section 221,
(layer 5): A lower embossed polymer film containing a recess and of cross-sectional profile 131.

The above co-assembly is laminated to form laminate 170, whilst including a liquid electrolyte containing the needed $^-/I_3^-$ couple, thereby yielding a polymer film that has the cross-sectional arrangement 230; namely.

an upper transparent polymer film 111 sandwiching a lower polymer film 131 which contains an embossed recess into which the back-contact solar cell fits. The assembled back-contact solar cell has the structure:
an upper electrode 211 upon which has been coated a $TiO_2$ layer 212, which has itself been coated with a suitable dye 213;
a spacer 150 to separate the electrodes and prevent short circuits;
a lower electrode 221, which acts as the counter electrode;
a liquid electrolyte inside the embossed recess and about the spacer elements and electrodes.

Upon illumination with sunlight, the laminated back-contact solar cell yields a voltage between the two electrodes. An external circuit connected to the two electrodes by connecting elements yields a current as a result of the influence of sunlight on the back-contact solar cell.

The laminated polymer structure of the solar cell is amenable to high-volume, low-cost mass production. The laminated polymer layers protect the solar cell and lengthen its lifetime.

The laminating polymer films may be, for example, Du Pont Sirlyn, polycarbonate, or a polyester. The liquid in the electrolyte may be, for example, acetonitrile, glutaronitrile, methoxypropionitrile, or valeronitrile.

The lamination process may involve three sides of the device being laminated first, after which the liquid electrolyte is introduced, with the fourth side being laminated thereafter.

Alternatively, the liquid electrolyte may be introduced into the recessed cavity immediately prior to lamination, which is so constructed as to trap the liquid electrolyte within the laminated polymer film.

EXAMPLE 4

Fabrication of a Solid-State Dye-Sensitized Solar Cell

This example describes an improvement of the method of fabrication of a solid-state dye-sensitized solar cell, for example of the type described in the journal paper entitled "Flexible and Compressible Gortex-PEDOT Membrane Electrodes for Solid-State Dye-Sensitized Solar Cells" published in Langmuir (2010), volume 26(3), page 1452, which is incorporated herein by cross-reference.

Figure 5:
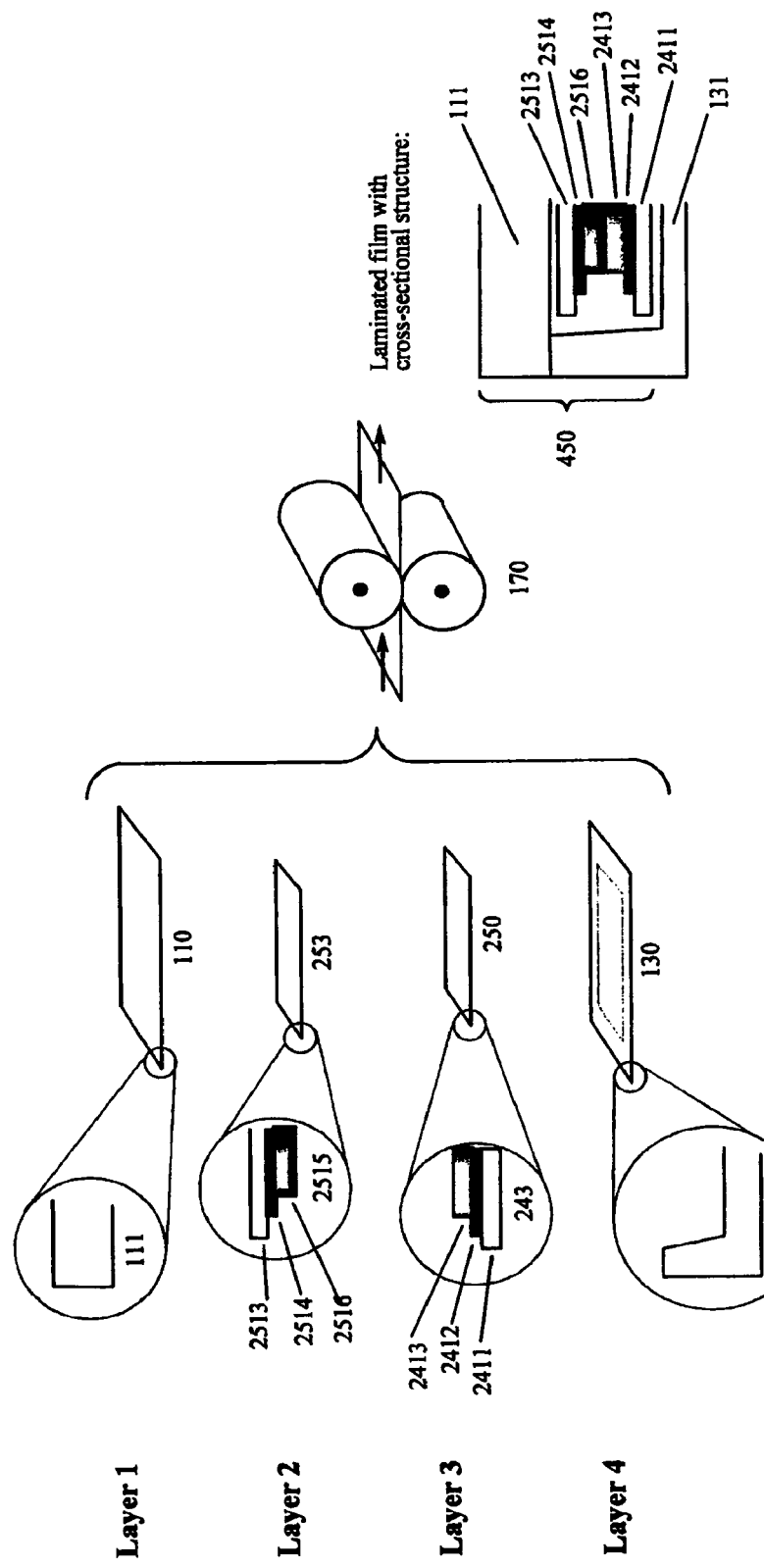
FIG. 5 comprises three schematic diagrams (a)-(c) which illustrate a method for assembling a solid state dye-sensitized solar cell.

FIG. 5(a) depicts the preparation of the working electrode sub-unit of a solid-state dye-sensitized solar cell prior to its final assembly. A polymer sheet 240 coated with a transparent conductive layer, such as indium tin oxide (ITO) or a transparent conductive ink of the ELK-series produced by NorCote, has the cross-sectional profile 241. The sheet is dip-coated or printed with a specially-formulated $TiO_2$ paste in step 300. The paste is then sintered using heat or pressure to yield a nanoparticulate $TiO_2$ coating 2412. The resulting sheet of cross-sectional profile 242 is then rolled up (at step 310), whilst ensuring that a small gap exists between each successive sheet in the roll. The resulting rolled up sheet 320 is then placed into a drum-like container 330 containing a coating solution, where it is, first, coated by adsorption of a suitable light-harvesting dye, followed by electrocoating of a PEDOT layer. Step 340 shows the rolled up sheet 320 in the drum 330 during this treatment. After completion of step 340, the sheet is removed from the drum, dried, and unrolled. The resulting sheet 250, now has the cross-sectional profile 243, which comprises of a transparent polymer sheet with transparent conducting layer 2411, which is overcoated with, first, a sintered $TiO_2$ layer 2412, and then, second, with a $TiO_2$-dye-PEDOT layer 2413.

FIG. 5(b) depicts the preparation of the counter electrode sub-unit of a solid-state dye-sensitized solar cell prior to its final assembly. The base substrate 251 is, for example, a Gortex membrane which has been coated with ca. 10 nm poly(maleic anhydride) using low-power plasma polymerization. The resulting plasma-treated Gortex membrane has the cross-sectional profile 2511. The membrane is then sputter-coated at step 400 with a layer (ca. 40 nm thick) of gold, titanium, or nickel to reduce the sheet resistance. The Gortex electrode is now designated 252 and has the cross-sectional profile 2512. It comprises the original plasma-treated membrane 2513 overcoated with a layer of gold, titanium, or nickel 2514. In the following step 410, one side of the membrane 252 is subjected to a vapour-phase polymerisation of PEDOT. The final form of the Gortex membrane 253 has a cross-sectional profile 2515 involving a plasma-treated Gortex base 2513, overcoated with a layer 2514 of gold, titanium, or nickel, overcoated by a layer 2516 of PEDOT.

FIG. 5(c) illustrates the assembly of the final solid-state dye-sensitized solar cell. A 4-layer co-assembly is made and laminated as follows (in the order top-to-bottom, as shown in FIG. 5(c)):
- (layer 1): An upper transparent polymer sheet 110 having the cross-sectional structure 111,
- (layer 2): An upper counter electrode 253, which has the cross-sectional profile 2515 (containing the original plasma-treated Gortex base 2513, overcoated with a layer 2514 of gold, titanium, or nickel, which has been further overcoated with a layer 2516 of PEDOT),
- (layer 3): A lower working electrode 250, which has the cross-sectional profile 243, comprising of a transparent polymer base coated with a transparent conducting layer 2411, which has been overcoated with sintered $TiO_2$ 2412, upon which a layer of dye and PEDOT 2413 has been deposited.
- (layer 4): A lower embossed polymer film containing a recess of cross-sectional profile 131.

Note that there is no spacer between layers 2 and 3 of the assembly. Instead, these layers are compressed together by the lamination process. A key advantage of the process is that the Gortex is highly compressible, thereby ensuring good electrical contact between layer 2 and 3. Preferably, there is no liquid electrolyte present in the assembly, which is fully solid-state.

The final assembly has the cross-sectional profile 450. The assembly comprises the upper polymer sheet 111 laminated to the lower polymer sheet 131. Within the recess in the lower polymer sheet is the solid-state dye-sensitized solar cell, which comprises of the counter electrode (plasma-treated Gortex 2513, overcoated with a conducting metallic layer 2514 and a layer of PEDOT 2516, compressed against the working electrode, which comprises the transparent conductive sheet 2411, overcoated with sintered $TiO_2$ 2412 and a layer of dye and PEDOT 2413).

Upon illumination with sunlight, the laminated solid-state solar cell yields a voltage between the two electrodes.

The laminated polymer structure of the solar cell is amenable to high-volume, low-cost mass production. The laminated polymer layers provide the required compression of the two electrodes. The laminated polymer layers also protect the solar cell and lengthen its lifetime.

EXAMPLE 5

Fabrication of a Water-Splitting Solar Cell

This example describes an improvement on methods of fabrication of a water-splitting solar cell, for example of the type described in International Publication No. WO2008/116254-A1, entitled "Water Oxidation Catalyst", which is incorporated herein by cross reference. This example also describes an improvement on the methodology employed for oxygen generation in the journal papers published in AngewandteChemie, International Edition (2008), Volume 47, page 7335 (entitled: "Sustained Water Oxidation Photocatalysis . . . "), the Journal of the American Chemical Society (2010), volume 132, page 2892 (entitled "Solar Driven Water Oxidation . . . ") and Chemistry and Sustainability, Energy and Materials (2010) in press (entitled "A Tandem Water-Splitting Device Based on a Bio-Inspired Manganese Catalyst"). This example further describes an improvement on the method employed for hydrogen generation in the journal paper published in Advanced Materials (2010), Volume 22(15) page 1727 entitled "Conducting Polymer Composite Materials for Hydrogen Generation".

FIG. 6(a) depicts the processes which are preferably applied to the sub-units which can be used to form the oxygen-generating working electrode of a water-splitting solar cell prior to its assembly. As shown in process 500, a coated titanium foil 210 of cross-sectional profile 191, is overprinted with a thin layer of the DuPont polymer Nafion 510, which has incorporated within it a suitable water oxidation catalyst.

As described in Example 3, the coated titanium foil 210 with cross-sectional profile 191 comprises of a thin, porous titanium foil base 211 which has been coated with a layer of sintered $SiO_2$ 212, upon which a layer of a suitable light-harvesting dye 213 has been adsorbed. Following the application of the process 500, the coated titanium foil 520 now has the cross-sectional profile 530 in which the earlier deposited layers 212-213 are overcoated with an additional layer of Nafion 510 containing a suitable water-oxidation catalyst. Examples of suitable water-oxidation catalysts and their corresponding light-harvesting dyes, and their methods of incorporation into the Nafion, include the bio-inspired manganese-oxo cluster described in the article published in AngewandteChemie, International Edition (2008), Volume 47, page 7335 (entitled: "Sustained Water Oxidation Photocatalysis . . . ") and the dye and catalyst combination described in the article published in the Journal of the American Chemical Society (2010), volume 132, page 2892 (entitled "Solar Driven Water Oxidation . . . "), which are incorporated herein by cross-reference. A variety of other physical arrangements of the working electrodes may be used.

Figure 6:
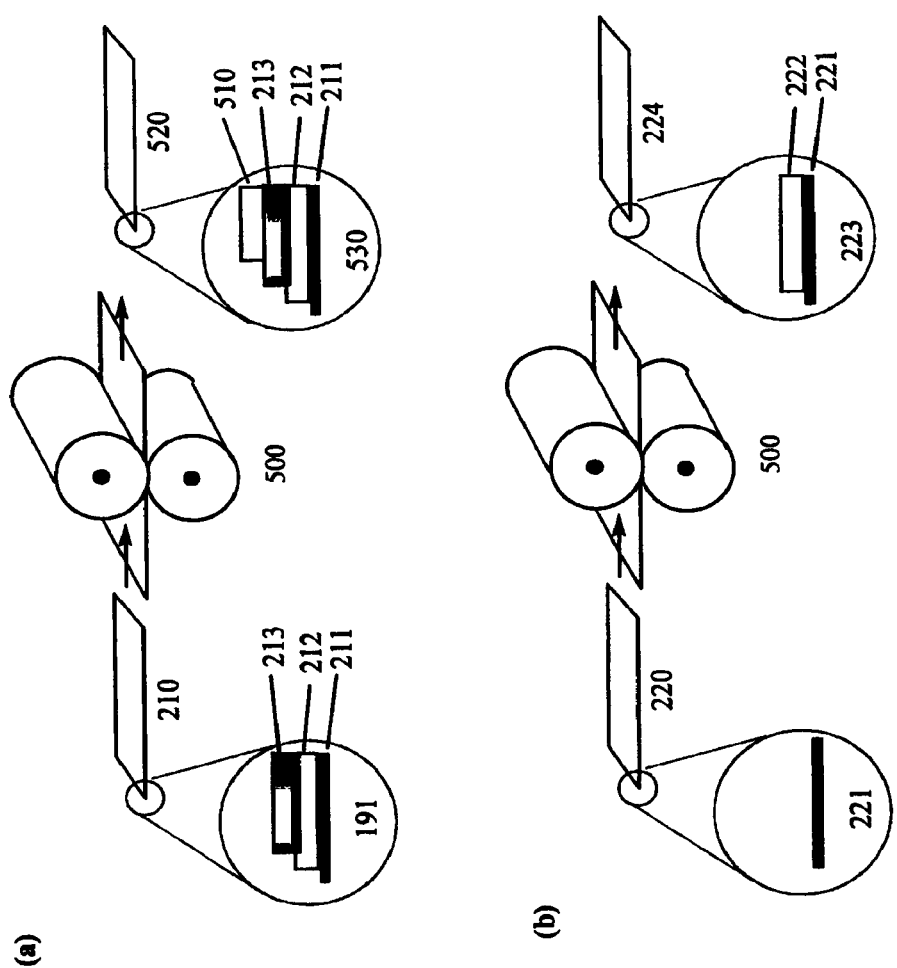
FIG. 6 shows two schematic diagrams which illustrate: (a) modification of the working electrode in a back-contact solar cell (of the type illustrated in FIG. 4) to incorporate a catalyst that is capable of oxidizing water to dioxygen, $O_2$, and (b) the modification of the counter electrode in such a cell to incorporate a catalyst that is capable of reducing water to dihydrogen, $H_2$.

FIG. 6(*b*) depicts the processes which are preferably applied to the sub-units which can be used to form the hydrogen-generating counter electrode of a water-splitting solar cell prior to its assembly. A virgin, thin titanium foil 220, having cross-sectional profile 221, is overcoated with a composite co-polymer 222 comprising of PEDOT and PEG (Polyethylene glycol), for example of the type described in the journal paper published in Advanced Materials (2010), Volume 22(15) page 1727 entitled "Conducting Polymer Composite Materials for Hydrogen Generation"), which is incorporated herein by cross-reference. The resulting counter electrode 224 now has a layered structure 223, comprising of a layer of PEDOT-PEG 222 overlaying the titanium foil 221.

Figure 7:
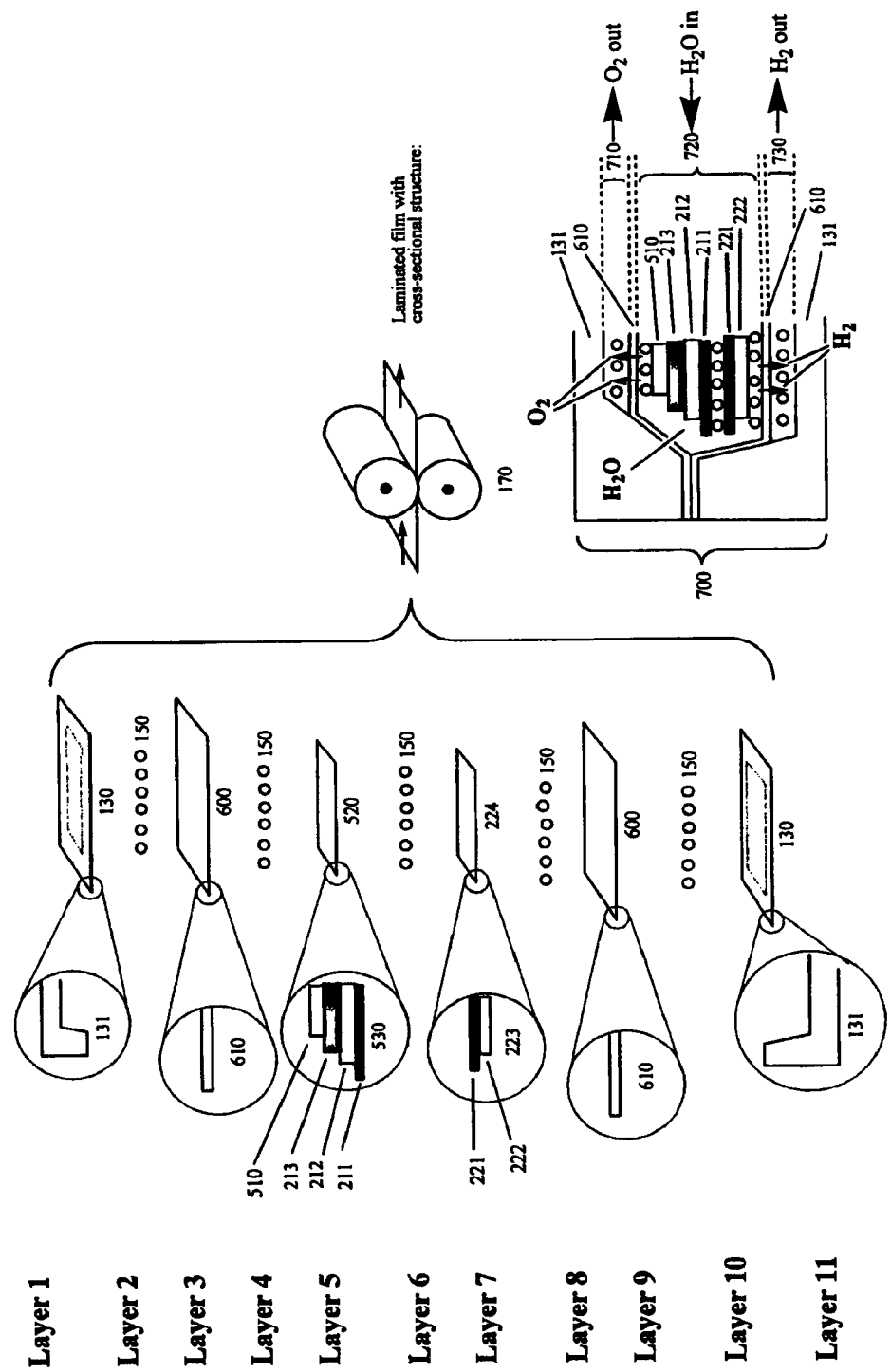
FIG. 7 is a schematic diagram illustrating an example method for manufacture of a water-splitting dye-sensitized solar cell.

FIG. 7 depicts the incorporation of a water-splitting solar cell or unit, including for example the above working and counter-electrodes, into a single solar water-splitting device. An 11-layer assembly, although other numbers of layers is possible, is laminated in process 170 (FIG. 7). In a particular example, the assembly comprises of the following individual layers (listed sequentially from top-to-bottom)

(Layer 1): An upper (i.e. first) transparent polymer film 130 containing an embossed or impressed recess as depicted in the cross-sectional profile 131, (Layer 2): A spacer layer 150 to separate the upper polymer sheet 130 from the gas permeable membrane 600 which is below spacer layer 150, (Layer 3): A thin, gas-(oxygen)-permeable, but water impermeable membrane or layer 600, having the cross-sectional structure 610, (Layer 4): A spacer layer 150 to separate the upper electrode 520 from the gas permeable membrane 600 above upper electrode 520, (Layer 5): The coated titanium foil working electrode 520, which has been prepared as described in FIG. 6(*a*) (that is, with the cross-sectional profile 530, containing the thin porous titanium foil 211 coated with sintered $TiO_2$ 212 upon which a layer of dye 213 has been adsorbed, followed by coating with a Nafion layer 510 which contains a suitable water oxidation catalyst). The working electrode 520 generates oxygen gas from water when it is operating correctly, (Layer 6): A spacer layer 150 to separate the working electrode 520 and counter electrode 224 and prevent short circuits, (Layer 7): A counter-electrode 224, which comprises of a virgin titanium foil having cross-section 221 coated with the PEDOT-PEG composite shown in FIG. 6(*b*). The counter-electrode generates hydrogen when operating correctly, (Layer 8): A spacer layer 150 to separate the counter electrode 224 from the gas permeable membrane 600 that lies below counter-electrode 224, (Layer 9): A thin gas-(hydrogen)-permeable, but water impermeable membrane or layer 600, having the cross-sectional structure 610, (Layer 10): A spacer layer 150 to separate the bottom polymer film 130 from the gas permeable membrane 600 which is above spacer layer 150, (Layer 11): A lower (i.e. second) polymer film 130 containing an embossed or impressed recess as depicted in the cross-sectional profile 131.

The above-mentioned co-assembly is laminated to produce laminate 170 (FIG. 7), whilst including water as an electrolyte into the central microfluidic cavity 720. Preferably a conduit is included in the microfluidic plumbing of the resulting laminate that allows a continuous flow of water to be fed into the water-splitting device. Preferably, the water electrolyte within the device is maintained under suitable pressure to halt the formation of bubbles of oxygen (at the working electrode) and hydrogen (at the counter electrode) during the operation of the water-splitting device. While bubbles would ideally be prevented from forming, gases will, nevertheless, be continuously generated and saturate the water electrolyte as dissolved species.

The resulting laminate 170 has the exemplary cross-sectional structure 700, which contains three distinct microfluidic cavities:

cavity 720, into which water is continuously (or potentially periodically) added as an electrolyte via a suitable conduit in the microfluidic plumbing of the laminate, cavity 710, into which oxygen gas that is generated at the upper working electrode 520 during water-splitting is transported (through membrane 610) and carried away. Preferably a conduit is included in the microfluidic plumbing of the laminate that allows a continuous flow of oxygen gas to be fed out of the device via the cavity 710, to thereby collect the oxygen that is produced. (The upper working electrode 520 comprises of layers 211, 212, 213, and 510).

cavity 730, into which hydrogen gas that is generated at the lower counter electrode 224 during water-splitting is transported (through membrane 610) and carried away. Preferably a conduit is included in the microfluidic plumbing of the laminate that allows a continuous flow of hydrogen gas to be fed out of the device, via the cavity 730, to thereby collect the hydrogen that is produced. (The lower counter electrode 224 comprises of the layers 221 and 222).

The cross-sectional profile 700 of the device, thus manufactured, therefore includes:

(i) an upper transparent, recessed polymer film 131 and a lower, counter-recessed polymer film 131 which sandwich two, recessed gas-permeable membranes, between which a water-splitting solar cell has been included, for example a water-splitting back contact solar cell. Suitable spacer layers or spacers separate each of these components. Examples of such spacer layers or spacers include, but are not limited to, ribs, embossed structures, beads, balls, etc. In still more specific, but non-limiting examples, the spacers may be Cellgard PP or PE separator membranes (Celgard LLC) or glass bubbles of the type produced by 3M (3M™ Glass Bubbles iM30K).The cross-sectional structure of the included water-splitting back-contact solar cell is (from to-to-bottom in sequence):

an upper spacer layer to separate the water-splitting back-contact solar cell from the remaining components.

an upper, working electrode 520, which generates oxygen gas from the water electrolyte when operating correctly. The working electrode 520 comprises a porous Titanium foil 211 upon which has been coated a $TiO_2$ layer 212, which has itself been coated with a suitable dye 213 and then with a Nafion layer 510 containing a suitable water oxidation catalyst, as shown in FIG. 6(a).

a spacer layer 150 to separate the working and counter electrodes of the water-splitting back-contact solar cell and prevent short circuits.

a lower, counter electrode 224, which acts as the counter electrode and generates hydrogen gas from the water electrolyte when operating correctly. The electrode 224 comprises a thin titanium foil 221, overcoated with a PEDOT-PEG composite 222 as shown in FIG. 6(b).

a lower spacer layer to separate the water-splitting back-contact solar cell from the remaining components.

(ii) the liquid electrolyte water inside the recess(es) or cavity 720, which is surrounded by gas permeable membranes 610, above and below.

It should be noted that both upper (i.e. first) and lower (i.e. second) polymer films 130 could be transparent. Furthermore, according to another example, only one of the upper (i.e. first) or lower (i.e. second) polymer films 130 could be provided with a recess, while the other polymer film is not recessed.

EXAMPLE 6

Types of Electrical Contacts

There is a need for external electrical connections that connect to the electrodes inside the laminate. FIG. 8 depicts examples of suitable external electrical contacts. The upper schematic in FIG. 8 depicts an insert that may be employed to provide an external electrical contact with the lower electrode in various example devices. The middle schematic of FIG. 8 depicts an insert that may be employed to provide an external electrical contact with the upper electrode in various example devices. These electrodes, that can be provided as inserts, can have a partial surface area that is conducting and a partial surface area that is insulating.

Referring to the upper schematic in FIG. 8:

In cases where the lower electrode in the device to be incorporated in the laminate is an exposed metal or conducting material (such as is described in Example 1), an insert 810 can be included in the assembly and lamination process as shown in 830 and 840 (where 800 is the upper polymer film of the laminate and 820 is the lower polymer film). The insert 810 may comprise of a thin metal or conductive material, where the conducting surface is exposed 811 on each end, with other areas 812 made insulating by coating with an insulator. When included in an assembly of the type described in Example 1 as shown in the upper schematic in FIG. 8, the lower exposed, conducting area 811 will necessarily be pressed into close contact with the lower, exposed, conducting electrode of the device incorporated within the recess 820 of the lower plastic sheet. The upper exposed area 811 (marked "L") of insert 810 would however lie outside of the laminate. Thus, an external electrical contact would be established between the upper exposed, conducting area 850 (marked "L") and the lower electrode of the device incorporated in the recess 830 of the lower polymer sheet. The insulating areas 812 will ensure that this electrical connection will not short-circuit with the upper electrode of the device incorporated in the recess 830.

Referring to the middle schematic in FIG. 8:

In cases where the upper electrode in the device to be incorporated in the laminate is an exposed metal or conducting material (such as is described in Example 1), an insert 860 can be included in the assembly and lamination process as shown in 870 and 880 (where 800 is the upper polymer film of the laminate and 820 is the lower polymer film). The insert 860 may comprise of a thin metal or conductive material, where the conducting surface is exposed 861 on each end, with other areas 862 made insulating by coating with an insulator. When included in an assembly of the type described in Example 1 as shown in the middle schematic in FIG. 8, the right-hand exposed, conducting area 861 will necessarily be pressed into close contact with the upper, exposed, conducting electrode of the device incorporated within the recess 820 of the lower plastic sheet. The left-hand exposed area 861 (marked "U") of insert 860 would however lie outside of the laminate. Thus, an external electrical contact would be established between the outer exposed, conducting area 890 (marked "U") and the upper electrode of the device incorporated in the recess 830 of the lower polymer sheet. The insulating areas 862 will ensure that this electrical connection will not short-circuit with the lower electrode of the device incorporated in the recess 830.

Referring to both the upper and middle schematic of FIG. 8:

In cases where one or more electrodes of the device to be incorporated in recess 820 do not have conductive surfaces directly exposed during lamination, the inserts 810 or 860 may be physically attached to the electrodes prior to the assembly being laminated. This attachment would involve a method that creates direct electrical connectivity between the conduction layer of the electrode and the inner exposed conduction surface 811 or 861 of the insert 810 or 860, respectively. For example, the insert may be glued to the electrically conductive surface of the electrode using a conducting glue. Alternatively, the insert may be soldered to the electrically conductive surface of the electrode. After connecting the insert, the assembly may proceed as normal. The resulting device will have an exposed electrical contact 850 or 890 at one side of the laminate.

For convenience and to avoid electrical short circuits, the upper electrode contact would typically be inserted at the opposite end of the device to that of the lower electrode contact. The two inserts may, for example, be included at the top and bottom of the device, or on the left and right of the device.

The lower schematic in FIG. 8 illustrates methods of connecting the external electrical contacts of cells constructed in this way. Cells may be arranged and connected in a "head-to-toe" arrangement (series connection) as shown in the left-hand schematic at the bottom of FIG. 8. Alternatively, cells may be arranged in a "side-by-side" arrangement (parallel connection).

EXAMPLE 7

Types of Plumbing for Liquid and Gas Movement Within Cells

Another feature which can be included in example embodiments of a water-splitting device is microfluidic plumbing for the purposes of moving gases or liquids in the cells. FIG. 9 illustrates examples of microfluidic plumbing which can be created by embossing or impressing the overlying or underlying polymer sheet(s) and/or attaching external connecting hoses, pipes, tubes, nozzles or the like.

The upper schematic in FIG. 9 illustrates microfluidic plumbing that would typically be suitable for transmission of both liquids or gases. A recess 910 that has been embossed or impressed within a laminating polymer sheet is connected to the outside of the laminate by a connecting hose 900. The hose would typically be separately moulded and then later affixed within a hole in the embossed recess, as shown. The hose may be glued into the hole, or mechanically jammed into the hole.

The lower schematic in FIG. 9 illustrates microfluidic plumbing which incorporates embossed or impressed spacer units 920 or 930, that would typically be suitable for transmission of gases only. Plumbing of this sort may be created by the use of a carefully tailored embossing dye that incorporates surface relief features capable of creating spacer units like 920 or 930. A connecting hose 940 connects the outside of the laminate with the plumbing. The hose would typically be separately moulded and then later affixed within a hole in the embossed recess, as shown. The hose may be glued into the hole, or mechanically jammed into the hole.

EXAMPLE 8

Further Embodiment of a Water-Splitting Device

This example describes a further embodiment of a water-splitting solar cell. In this example the fabrication process and resulting device is different to that illustrated in FIG. 7. In this example use is made of an extruded twin-wall plastic sheet having a series of vertical spacers or ribs(herein referred to as "twin-wall sheet") that are periodically spaced along and between the twin-walls to keep them separated.

The sheet can be made from a polymer, preferably polypropylene, although a range of other plastics can be used. In specific examples, the sheet can be made from a polypropylene co-polymer or high density polyethylene. It is also possible, and perhaps desirable in this application, to make the different walls of the sheet from different materials, for example a conductive polymer, a non-conductive polymer, a transparent polymer, an opaque polymer, or combinations thereof. In a particular non-limiting example, the extruded twin-wall plastic sheet can be Corflute® or Fluteboard® twin-wall sheet manufactured by Corex Plastics (Australia) Pty Ltd, or similar products sold by other manufacturers and sometimes termed corrugated plastic.

The twin-wall sheet can be used as a frame or skeleton in an additional embodiment of the water splitting device. The ribs or corrugations of the twin-wall sheet provide the spacers (i.e. spacer layer). In this example, the following steps can be used to manufacture the water splitting device.
(1) Manufacturing or obtaining the twin-wall sheet.
(2) Treating the twin-wall sheet with a coating process, such as dip-coating, which applies a thin layer of conducting metal, for example and preferably nickel, deposited on at least part of the internal (inside) surface(s) of the twin-wall sheet.
(3) The deposited metal layer, e.g. nickel layer, is used as an electrode in water electrolysis (especially alkaline water electrolysis). The resulting oxygen or hydrogen gas bubbles are guided and confined by the internal cavities of the twin-wall sheet (from where the gas can be collected). A variety of suitable catalysts can also be utilised, for example $LiCo_2O_4$, coated onto a suitable deposited metallically-conductive layer.
(4) By combining two or more twin-wall sheets as above, as opposing or co-electrodes in a planar electrolyzer, stacked twin-wall sheets can be used as a water-splitting device.

In a further variation, the twin-wall sheet can be extruded during manufacture with two different polymers as the walls—one wall being a "conductive" polymer, on which a metal such as nickel is readily coated, and the other wall being a "non-conductive" transparent polymer on which metal such as nickel does not plate. This results in a unit having one layer (i.e. outer polymer layer or wall) transparent, and the other layer (i.e. other outer polymer layer or wall) an electrode. Such a unit can be used as a solar cell, where light enters through the transparent layer and falls on the internal electrode surface. The gases generated are still collected by the internal channels of the twin-wall sheet.

Thus, in the twin-wall sheet example water-splitting device, the, frame or skeleton of the device, including the ribs or separators acting as spacers, is manufactured first and the internal components/layers are then added or incorporated. Thus, the order of manufacture of the water-splitting device may be varied and the order of application of the layers in the device may also be varied. The electrodes may be produced on a pre-assembled frame or skeleton.

This example generally provides a water-splitting device including a first electrode for producing oxygen gas and a second electrode for producing hydrogen gas from water. The first electrode and the second electrode are positioned between a first outer polymer layer (i.e. wall) of a first twin-wall sheet, and a second outer polymer layer (i.e. wall) of a second twin-wall sheet that are stacked together. At least one spacer layer, that is the series of ribs from either the first twin-wall sheet or the second twin-wall sheet is positioned between the first outer polymer layer and the second outer polymer layer.

In this example, it can also be said that there are two or more spacer layers (the series of ribs from the first twin-wall sheet and the series of ribs from the second twin-wall sheet) positioned between the first outer polymer layer and the second outer polymer layer. The first outer polymer layer (i.e. wall) thus forms at least part of a channel for the oxygen gas and the second outer polymer layer (i.e. wall) thus forms at least part of a further channel for the hydrogen gas.

The produced water-splitting device still has the form of a multi-layer device for water splitting which has plastic or polymer outer walls enclosing electrodes and spacers, that is at least one spacer layer.

According to a particular non-limiting form, a further example water-splitting device utilising twin-wall sheets is now described in more detail by way of illustration.

An example of twin-wall sheet, so-called "conductive" Corflute® sheet (M/F 4.0 mm 750 gsm) manufactured by Corex Plastics (Australia) Pty Ltd, was purchased. According the specifications provided by the manufacturer, the twin-wall sheet comprised of polypropylene doped with ca. 30% by weight of carbon black. The presence of the carbon black makes the polymer weakly conductive. "Conductive" corrugated plastics of this type are used as packaging in applications where static electricity needs to be minimized (e.g. during the transportation of electrical components). Several non-conductive Corflute® sheets of similar dimensions were also purchased.

Figure 10:
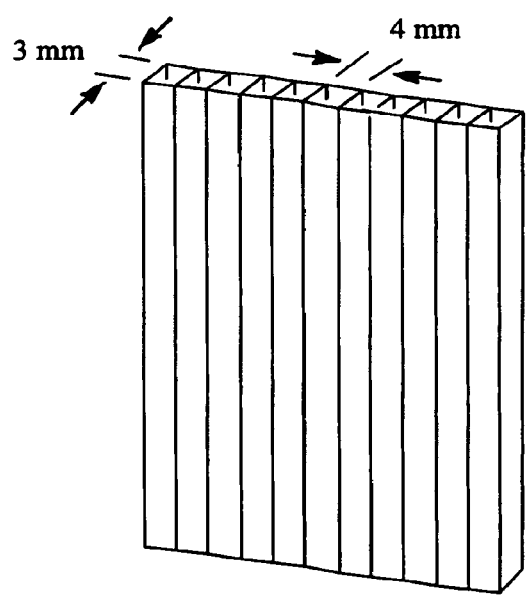
FIG. 10 provides a schematic illustration of an example corrugated (i.e. twin-wall) plastic sheet before and after coating by electroless nickel plating.

Corflute® sheets are an example of a corrugated plastic comprising of two layers of polymer held apart and separated by a succession of regularly-spaced plastic ribs lying orthogonal to the two outer plastic layers (that is, "twin-wall sheet"). The ribs create channels that run the length of material. FIG. 10 provides a schematic illustration of the "conductive" (M/F 4.0 mm 750 gsm) Corflute® sheet referred to above. As can be seen, in this exemplar material, the outer layers of plastic are separated by ca. 3 mm, with the ribs between the layers periodically spaced ca. 4 mm apart. The result is that this material has a honeycombed structure, comprising of a linear succession of parallel channels, each of which have dimensions 3 mm×4 mm and which run the length of the structure.

The Corflute® sheet samples were subjected to a dip-coating process used to carry out electroless nickel plating. Electroless nickel plating is known to be used to coat ABS (acrylonitrile butadiene styrene)polymers with a thin layer of nickel upon which a variety of metallic finishes may then be electrolytically deposited. The nickel layer provides a highly conductive surface for the subsequent electrolytic deposition step. The key advantages of electroless nickel plating include: (1) No electrical current is required for the plating—it is electroless, meaning that nickel plates purely as a result of being dipped in the plating solution (—the thickness of the plated layer depends on the dip time and the strength of the plating solution), and (2) the nickel plates extremely uniformly over the item, including for irregular surface structures.

The electroless nickel process used in the case of the Corflute® sheet examples referred to above comprised of two dip-coating procedures, the first of which involved a so-called "palladium strike", in which microcrystallites of palladium are first deposited on the item surface to serve as crystallization sites for the subsequent nickel deposition, followed by dip-coating in an electroless nickel bath.

Tests indicated that the standard, "non-conductive" Corflute® sheet samples were entirely resistant to nickel coating using the above procedure. No nickel could be deposited on their surfaces using the above technique. However, the "conductive" Corflute® sheet samples were readily coated with a layer of nickel using this example procedure. Moreover, the layer thickness could be readily varied by changing the time during which the Corflute® sheet was dipped—the relationship was roughly 1 µm thickness for every 1 minute of dipping time using the electroless nickel coating solution employed by A Class Metal Finishers.

It has hitherto been common-wisdom that polymers like polypropylene, which contain no readily accessible functional groups on their surface, cannot be coated with nickel or other metals using electroless plating. However, surprisingly it has been identified that such polymers may be rendered "plate-able" using electroless techniques, by the incorporation of substantial quantities of carbon black or other conductive particulates within them.

Also of relevance, is the fact that nickel serves as the industry-standard electrode material for both the cathode and anode in alkaline water electrolyzers. In commercial electrolyzers of this type, nickel sheets or nickel-coated stainless steel are widely used. In the latter case, the stainless steel needs to be of a type that withstands the highly alkaline environment (typically 3-6 M KOH) that is used in this class of electrolyser.

It is also relevant that polypropylene, which is typically used as the polymer in twin-wall sheets, such as Corflute® sheets and other corrugated plastics, is extremely resistant to degradation in strongly alkaline solutions. It is known in the art that polypropylene is unaffected by extreme, basic, environmental conditions.

Thus, the combination of nickel-coated polypropylene twin-wall sheets, for example nickel coating of the "conductive" Corflute® sheets described above, opens the possibility of a "plastic"-based electrolyser module for application in alkaline water electrolysis.

To assess this possibility, nickel-coated Corflute® sheets were tested as the cathode and anode in alkaline water electrolysis. Two sheets of nickel-coated Corflute® sheet were placed adjacent to each other, but not in electrical contact, within a glass bath containing 1 M aqueous KOH solution. The twin-wall sheets were oriented so that the internal channels ran from top-to-bottom (not from side-to-side).

Figure 11:
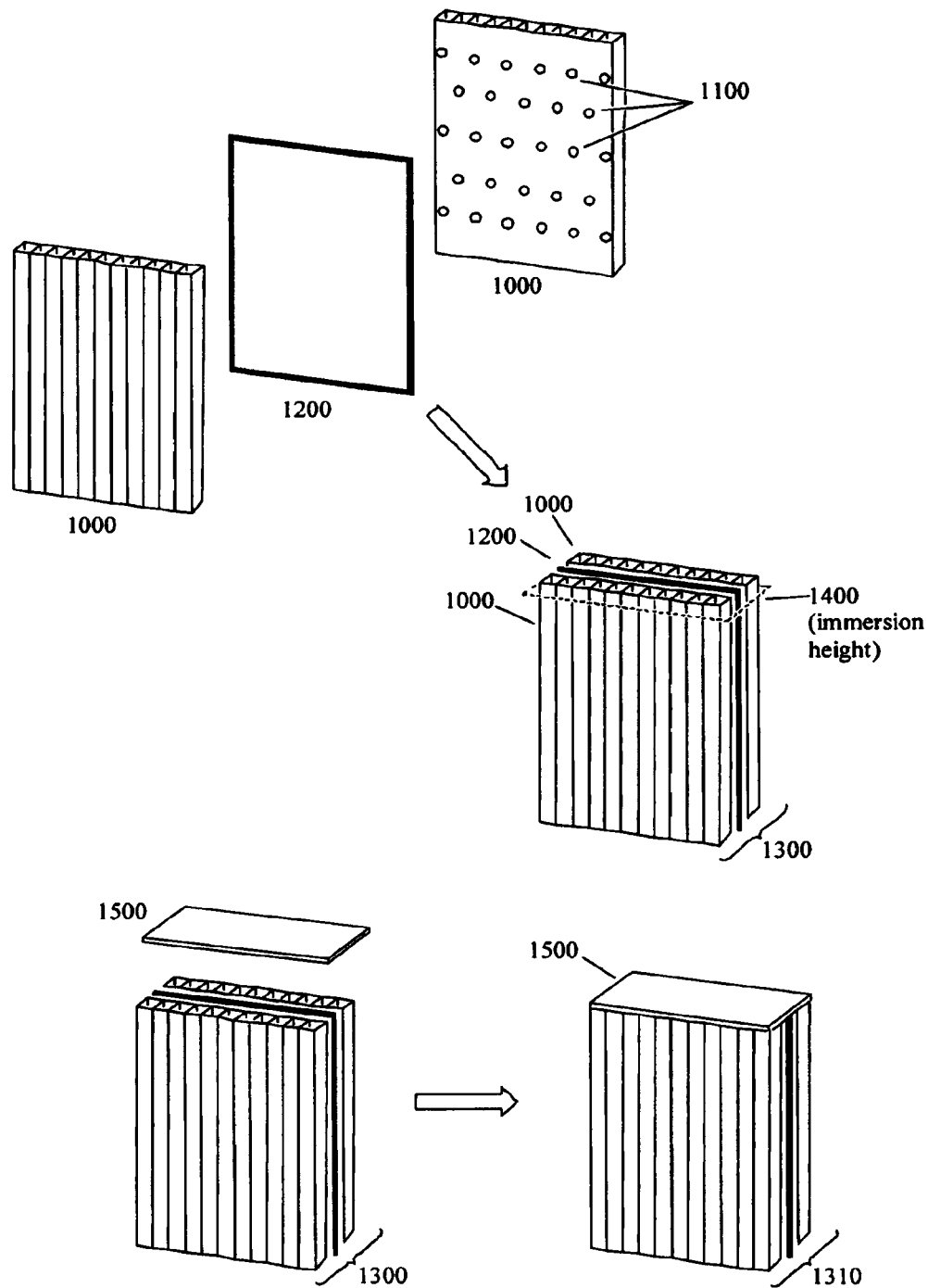
FIG. 11 is a schematic illustration of an electrolysis module comprising of nickel-plated twin-wall sheet structures.

FIG. 11 depicts the experimental arrangement in this proof-of-concept device. Two nickel-coated Corflute® sheets 1000 were prepared and faced toward each other as shown in FIG. 11. A series of small holes 1100 were drilled into the facing sides on each twin-wall sheet 1000. The holes are required to allow for movement of the electrolyte solution between the two twin-wall sheet electrodes. A spacer 1200, which comprised in one embodiment, of a gasket-like insulating polypropylene was introduced between the two twin-wall sheets. The spacer 1200 separated the two sheets 1000 and prevented a short circuit due to electrical contact between the nickel coatings on the two sheets 1000. The spacer 1200 was hot welded to the two sheets 1000, enclosing and sealing the space between the two sheets 1000. The entire assembly 1300 was then immersed up to the level shown at 1400,in an aqueous solution containing 0.1-3 M KOH.

The twin-wall sheets 1000 in the assembly 1300 were separately connected to a potentiometer, with one sheet polarized as the anode and the other sheet as the cathode. A voltage of 2-4 V was then applied between the two sheets. Upon the application of a voltage within this range, bubbles of hydrogen could be seen to immediately start forming on the cathode; bubbles of oxygen formed on the anode. The bubbles continued as long as the voltage was applied, over a period of 24 hours, without any significant fall-off in the rate of gas generation or current measured (under a constant applied potential). When the voltage was turned off, gas generation ceased immediately. When it was then turned on again, gas generation immediately re-commenced.

The bubbles referred to above were readily observable on the outside of the nickel-coated twin-wall sheets 1000. However, when viewed from above, it could also be seen that a substantial volume of bubbles were formed within the inner channels of the twin-wall sheet electrodes, which have a substantially higher geometric and electrochemical area than the outside. These bubbles rose to the surface of the electrolyte solution, guided by the channels. At the top of each channel a layer of froth-like bubbles was seen to form. A gas-permeable, but water-impermeable Nafion membrane 1500 was stretched over the top of the internal channels and attached to thereby allow separation of the gases in the bubbles from the aqueous electrolyte solution within the inner channels of the twin-wall sheets. The resulting assembly 1310 generated gases which permeated through the membrane 1500.

Thus, the internal channels of the twin-wall sheets 1000 provided spacer layers within which gas bubbles could form and be separated. Separate experiments also indicated that the internal channels of the twin-wall sheet samples could be moderately pressurized; that is, gases could potentially also be formed and collected under moderate pressures when a twin-wall sheet-like polymer structure was used as the electrolyser unit.

Thus, there is provided a first electrode for producing oxygen gas, and a second electrode for producing hydrogen gas from water. The first electrode and the second electrode are positioned between a first outer polymer layer, i.e. an outer wall of one of the twin-wall sheets, and a second outer polymer layer, i.e. an outer wall of the other twin-wall sheet. At least one spacer layer, provided by the ribs of either of the twin-wall sheets, is positioned between the first outer polymer layer and the second outer polymer layer.

To further optimize the performance of the twin-wall sheet electrodes, the nickel coatings may themselves be electro-coated or coated in other ways, with a variety of catalytic materials, or materials which improved the catalytic performance under similar or less alkaline conditions. Examples of such materials are described in a study entitled: "Pre-Investigation of Water Electrolysis", Report PSO-F&U 2006-1-6287, issued by the Department of Chemistry, Technical University of Denmark (KI/DTU), the Fuel Cells and Solid State Chemistry Department, Risø National Laboratory, Technical University of Denmark, and DONG Energy. The investigation constituted the main part of the project 6287 "Pre-investigation of Electrolysis" funded by the Danish Public Service Obligation programme (PSO) under Energinet.dk. Since the issuance of that report, a variety of other, efficient catalysts have been discovered, including a range of catalysts that mimic the active sites in the hydrogenase and the photosystem II photosynthetic enzymes.

Figure 12:
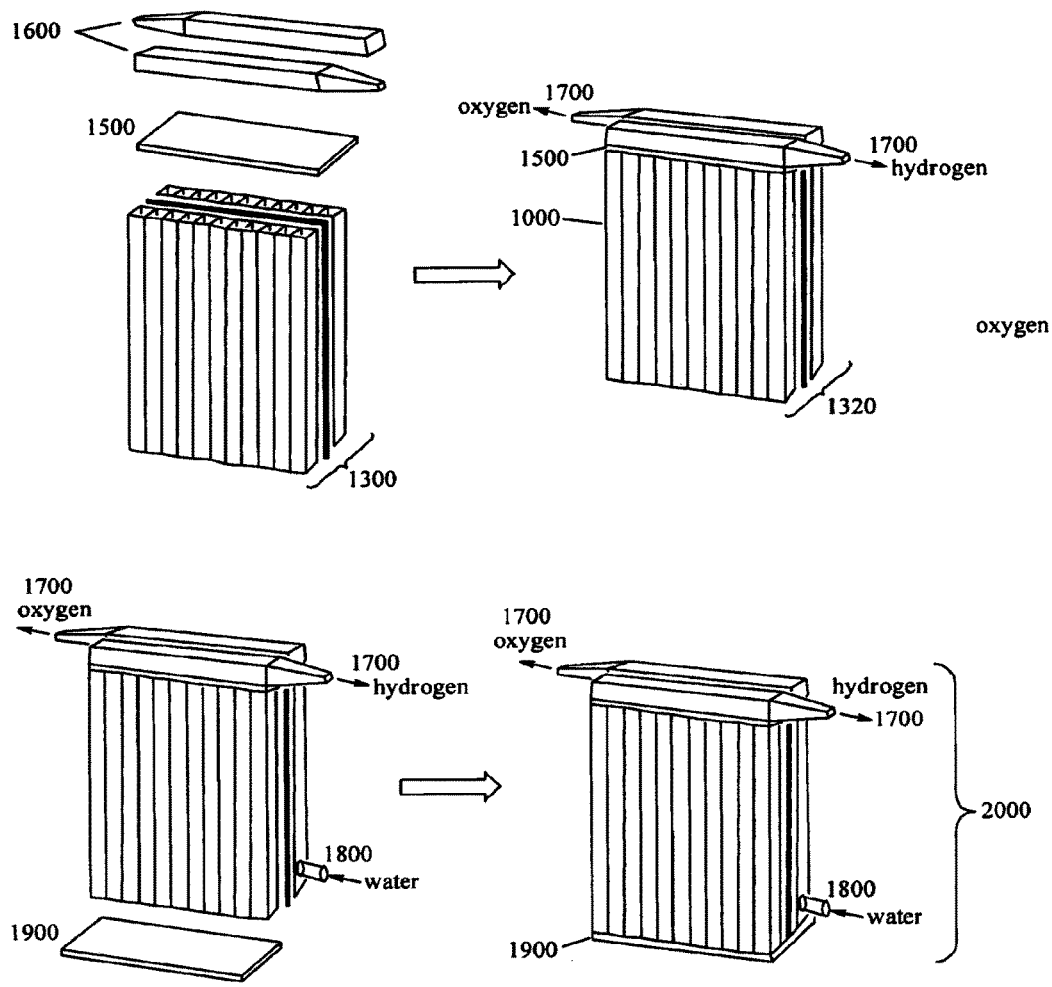
FIG. 12 is a schematic illustration of an example process by which a sealed polymer electrolyser may be manufactured.

On the basis of these results, several forms of polymer and/or alkaline electrolysers are possible. FIG. 12 displays a schematic of one such electrolyser. An assembly 1300 has a gas permeable membrane 1500 sealed over the top of the twin-wall sheet channels. Atop the membrane, two polymer gas collection plumbing units 1600 are affixed and sealed. One gas collection plumbing unit 1600 is affixed in such a way that it exclusively collects the gases arising from the cathode (hydrogen) 1700. The other gas collection plumbing unit is affixed in such a way as to exclusively collect gases arising from the anode (oxygen) 1700. When immersed in an aqueous electrolyte solution, the resulting unit 1320 generates hydrogen and oxygen gas upon the application of a suitable voltage. The gases are collected separately.

The assembly 1320 can be turned into a sealed cell by attaching and sealing a water and gas impermeable polymer base 1900 to the bottom of the assembly 1320. If a water inlet 1800 is then also introduced as shown, then the resulting unit is a sealed cell 2000 into which water may be introduced (through the inlet 1800) and out of which hydrogen and oxygen are collected at cathode and anode 1700. The cell 2000 does not need to be immersed into the electrolyte solution. Instead, it contains the electrolyte solution wholly within itself.

Sealed cells 2000 of this type are modular units which can be connected to each other in series or parallel in order to generate quantities of hydrogen and oxygen. Moreover, sealed cells may be pressurized to generate the gases under moderate pressures.

Figure 13:
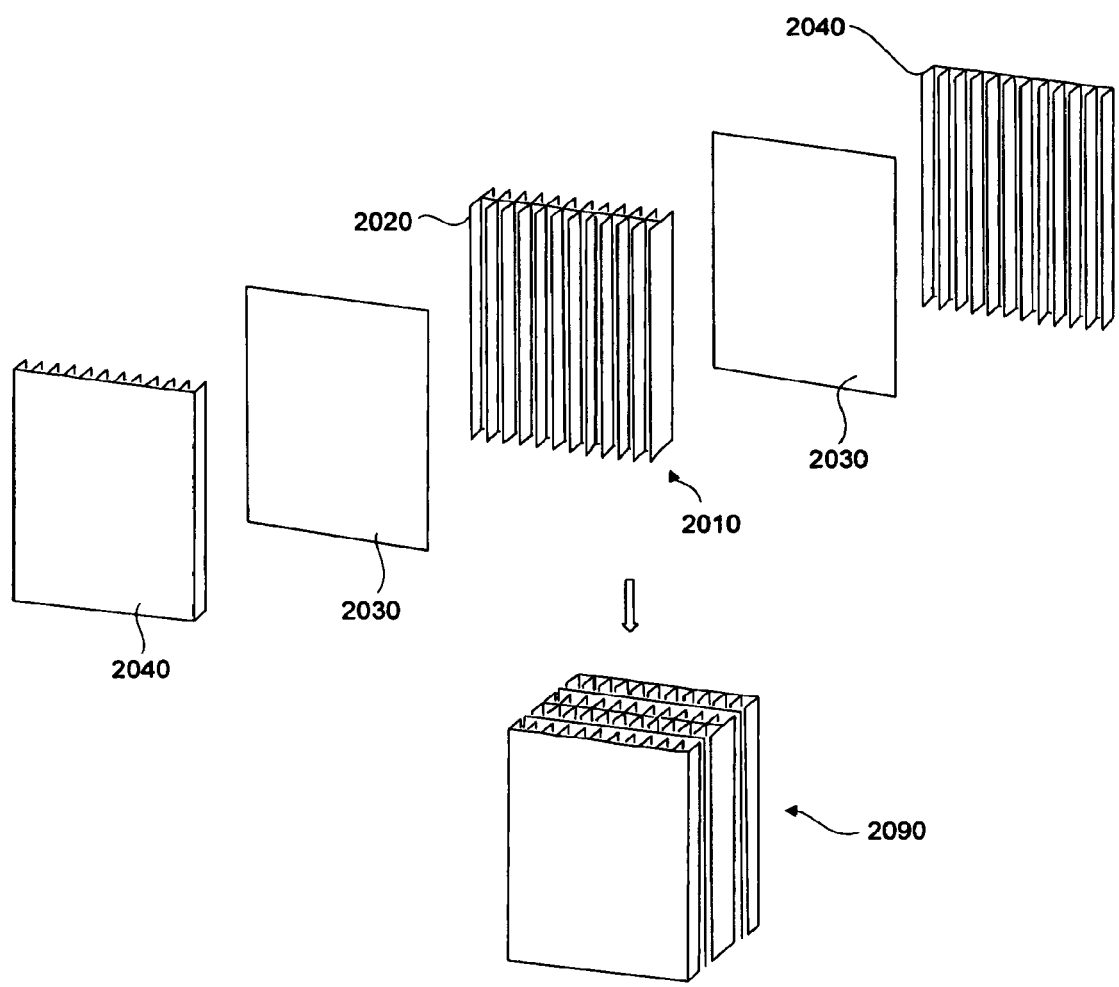
FIG. 13 is a schematic illustration of an alternative example of part of a polymer electrolyser.

A variation on the sealed cell 2000 of FIG. 12 is illustrated as partial cell 2090 in FIG. 13. A plastic spacer 2010 includes a single sheet of polymer with ribs 2020 pointing outward on both sides. Spacer 2010 can also have small holes down the length of the polymer sheet. Two metallic films 2030 are pressed up against the ribs 2020 on each side of spacer 2010. The films 2030 can be made of, for example nickel, but other metals or conductors are possible. Also, films 2030 may be a material coated with a metal such as nickel. Furthermore, different metals or conducting materials could be used for each film 2030. The films 2030 act as the electrodes. The films 2030 may be decorated with surface coatings containing other catalysts. The films 2030 may have tiny holes in them to allow for water to move between the films. Outer polymer housings 2040, which can also be ribbed on one side, are used to sandwich the whole arrangement into a sealed cell. Gas collection plumbing and water inlet valves can be provided similar to those depicted in FIG. 12.

A further variation of a modular water electrolyser based on a twin-wall sheet-like or corrugated plastic structure, involves the manufacture of a solar-driven or solar assisted water electrolysis device of this type.

Figure 14:
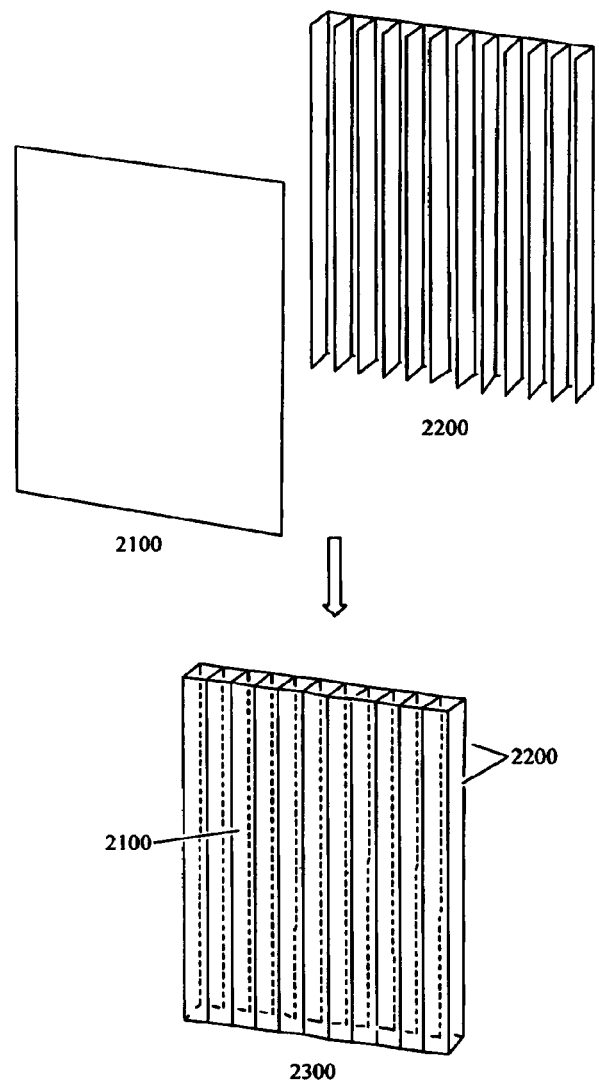
FIG. 14 depicts schematically how to manufacture a twin-wall-type unit including a transparent wall for use in solar-driven or solar-assisted water electrolysis.

FIG. 14 shows how a twin-wall sheet having utility in solar-driven or solar-assisted water splitting may be manufactured. Twin-wall sheets are typically manufactured by extruding a sheet of polypropylene containing the upright ribs (2200) closely adjacent to a separate polypropylene sheet 2100 extruded directly above it. The two component sheets 2100 and 2200 are then layered upon each other immediately after they have exited the extruder and while they are still hot. In the process of cooling, the two component sheets 2100 and 2200 are welded to each other, thereby generating the characteristic double-layer or twin-wall structure. Because the two layers are extruded separately, it is possible to use different polymer feed stocks in each layer or component sheet. FIG. 14 depicts the example situation where a "conductive" polypropylene (containing 30% carbon black) is used to extrude the ribbed sheet 2200, while "non-conductive", transparent polypropylene is used to extrude the upper, non-ribbed sheet 2100. When component sheets 2100 and 2200 are combined to form the twin-wall sheet 2300, the upper surface 2100 of sheet 2300 will be transparent (and "non-conductive"), while the lower surface and the ribs 2200 will be black (and conductive).

Thus, twin-wall sheet 2300 includes one surface transparent to light. When the twin-wall sheet 2300 is subjected to electroless nickel plating, only the "conductive", lower layer and ribs 2200 will be plated with nickel (or other selected metal or conductor). The upper, transparent component sheet 2100 will remain uncoated and transparent. A light-driven or light-assisted catalyst may then be selectively affixed to the nickel layer of the lower, ribbed "conductive" surface, leaving the transparent surface untouched. When the aqueous electrolyte is introduced into the channels of the resulting twin-wall unit, the catalyst may act under the influence of sunlight to facilitate the water-splitting transformation. Using such a twin-wall unit in a sealed cell of the type 2000, may yield a light-driven or light-assisted electrolyzer.

A "hybrid" electrolyser may be constructed by, for example, combining a solar-driven anode twin-wall unit and an electrically-driven anode twin-wall unit with a common mutual cathode twin-wall unit. Such an electrolyzer will be capable of generating gases for 24 hours of operation, with the light-driven anode operating with the assistance of sunlight during the day and the electrically-driven anode operating at night. The mutual cathode can operate at all hours.

Various other combinations of electrodes can be envisioned.

The key advantage of using twin-wall sheets or corrugated plastics, in the manufacture of electrolyzers, is their low cost and ready commercial availability. Moreover, the polymeric structures of these units can be readily modified by hot welding, melting and re-solidifying.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

It will be appreciated that the embodiments described above are intended only to serve as examples, and that many other embodiments are possible with the spirit and the scope of the present invention.

The invention claimed is:

1. A water splitting device comprising at least one cathode and at least one anode, wherein at least one liquid-permeable and gas-permeable spacer layer is positioned between the at least one cathode and the at least one anode, and wherein the water splitting device is arranged so that liquid electrolytes can permeate through the at least one liquid-permeable and gas-permeable spacer layer and thus be in fluid communication with both the at least one cathode and the at least one anode, wherein the spacer layer comprises embossed structures defining microfluidic plumbing structures configured for transmission of gas.

2. The water splitting device according to claim 1, wherein the at least one spacer layer extends substantially across a surface of either or both of the at least one cathode and the at least one anode.

3. The water splitting device according to claim 1, wherein the at least one spacer layer separates the at least one anode and the at least one cathode and permits a flow of the liquid electrolytes therebetween.

4. The water splitting device according to claim 1, wherein the at least one cathode and the at least one anode are formed from one or more flexible materials.

5. The water splitting device according to claim 1, wherein the at least one spacer layer additionally comprises ribs, nets, woven fabric material, non-woven fabric material, beads, balls or separator membranes.

6. The water splitting device according claim 1, wherein there are at least two cathodes and at least two anodes arranged in at least two cathode-anode pairs, and wherein a spacer layer of the at least one spacer layer is positioned between a cathode and an anode of two or more of the at least two cathode-anode pairs.

7. The water splitting device according to claim 1, wherein the at least one cathode and the at least one anode are positioned between a first outer polymer layer and a second outer polymer layer.

8. The water splitting device according to claim 7, wherein a first gas permeable layer is positioned between the first outer polymer layer and the at least one cathode, and a second gas permeable layer is positioned between the second outer polymer layer and the at least one anode.

9. The water splitting device according to claim 7, wherein the first outer polymer layer and the second outer polymer layer are flexible.

10. The water splitting device according to claim 7, wherein the first outer polymer layer or the second outer polymer layer is formed of a conductive polymer on which a metal is deposited.

11. The water splitting device according to claim 7, wherein either one or both of the first outer polymer layer and the second outer polymer layer are transparent.

12. The water splitting device according to claim 11, wherein the at least one cathode and the at least one anode form at least part of a solar cell.

13. The water splitting device according to claim 12, wherein the first outer polymer layer and/or the second outer polymer layer include a recess into which the solar cell at least partially fits.

14. The water splitting device according to claim 11, wherein either one or both of the at least one cathode and the at least one anode include a titanium foil or coated titanium film.

15. The water splitting device according to claim 11, wherein either one or both of the at least one cathode and the at least one anode include a covering layer which includes a water oxidation catalyst.

16. A method for treating water, comprising applying a voltage between the at least one cathode and the at least one anode of the water splitting device according to claim 1 which includes water, thereby splitting at least some of the water and producing hydrogen.

17. A water splitting device comprising:
at least one cathode and at least one anode arranged in at least one cathode-anode pair;
at least one electrolyte layer spacer positioned in an electrolyte layer of the at least one cathode-anode pair, wherein the at least one electrolyte layer spacer separates the at least one anode and the at least one cathode and permits a flow of liquid electrolytes therebetween;
at least one gas permeable membrane and at least one gas layer spacer, wherein the at least one gas layer spacer is positioned outside the electrolyte layer and adjacent the at least one gas permeable membrane, and
wherein the water splitting device is arranged so that the liquid electrolytes can permeate through the at least one electrolyte layer spacer and thus be in fluid communication with both the at least one cathode and the at least one anode;
wherein at least one of the electrolyte layer spacer and the gas spacer layer comprises embossed structures defining microfluidic plumbing structures configured for transmission of gas.

18. The water splitting device according to claim 17, wherein there are provided two or more cathode-anode pairs.

19. The method for treating water according to claim 16, including maintaining an electrolyte under conditions to suppress the formation of at least one of oxygen gas and hydrogen gas in the electrolyte.

* * * * *